(12) United States Patent
Lewis et al.

(10) Patent No.: US 11,647,061 B2
(45) Date of Patent: *May 9, 2023

(54) GROUP CURATED MEDIA CHANNELS

(71) Applicant: Google LLC, Mountain View, CA (US)

(72) Inventors: Justin Lewis, South San Francisco, CA (US); Jonathan William Ray, Venice, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,766

(22) Filed: Dec. 22, 2021

(65) Prior Publication Data

US 2022/0116433 A1 Apr. 14, 2022

Related U.S. Application Data

(63) Continuation of application No. 16/534,681, filed on Aug. 7, 2019, now Pat. No. 11,212,327, which is a
(Continued)

(51) Int. Cl.
| | | |
|---|---|---|
| G06F 15/16 | (2006.01) |
| H04L 65/403 | (2022.01) |
| G06Q 50/00 | (2012.01) |
| H04N 21/462 | (2011.01) |
| H04N 21/25 | (2011.01) |
| H04N 21/254 | (2011.01) |
| H04N 21/2668 | (2011.01) |

(Continued)

(52) U.S. Cl.
CPC ........... *H04L 65/403* (2013.01); *G06Q 50/01* (2013.01); *H04L 67/566* (2022.05); *H04N 21/252* (2013.01); *H04N 21/2541* (2013.01); *H04N 21/2668* (2013.01); *H04N 21/4622* (2013.01); *H04L 63/104* (2013.01)

(58) Field of Classification Search
None
See application file for complete search history.

(56) References Cited

U.S. PATENT DOCUMENTS

| | | |
|---|---|---|
| 8,161,172 B2 | 4/2012 | Reisman |
| 2009/0144786 A1 | 6/2009 | Branam et al. |

(Continued)

OTHER PUBLICATIONS

Notice of Allowance dated Jan. 17, 2018 in U.S. Appl. No. 14/081,760.
(Continued)

*Primary Examiner* — Phyllis A Book
(74) *Attorney, Agent, or Firm* — Byrne Poh LLP

(57) ABSTRACT

A system for collaboratively generating and/or managing a media channel is provided. The system includes an identification component, a generation component and a permissions component. The identification component identifies a first set of media content associated with a first social group and a second set of media content associated with a second social group. The generation component generates a media channel based on the first and second sets of media content identified as being respectively associated with the first and second social groups. The permissions component grants access to the media channel based at least on permissions generated for the first and second sets of media content in connection with the respective first and second social groups.

21 Claims, 16 Drawing Sheets

Related U.S. Application Data continuation of application No. 15/988,778, filed on May 24, 2018, now Pat. No. 10,382,505, which is a continuation of application No. 14/081,760, filed on Nov. 15, 2013, now Pat. No. 9,985,998.

(51) Int. Cl.
*H04L 67/566* (2022.01)
*H04L 9/40* (2022.01)

(56) References Cited

U.S. PATENT DOCUMENTS

| | | | |
|---|---|---|---|
| 2010/0125605 A1 | 5/2010 | Nair et al. | |
| 2010/0287236 A1 | 11/2010 | Amento et al. | |
| 2011/0126257 A1 | 5/2011 | Goergen et al. | |
| 2012/0143917 A1* | 6/2012 | Prabaker | G06F 16/00 707/E17.107 |
| 2012/0197980 A1* | 8/2012 | Terleski | G06Q 50/01 709/203 |
| 2012/0297038 A1 | 11/2012 | Mei et al. | |
| 2013/0086079 A1* | 4/2013 | Chaudhuri | G06F 16/24578 707/748 |
| 2013/0091210 A1* | 4/2013 | Rajakarunanayake | H04L 67/306 709/204 |
| 2013/0097246 A1 | 4/2013 | Zifroni et al. | |
| 2013/0097253 A1 | 4/2013 | Mencke | |
| 2013/0174275 A1 | 7/2013 | Micucci et al. | |
| 2013/0238796 A1* | 9/2013 | Lentzitzky | H04L 41/12 709/225 |
| 2013/0246530 A1 | 9/2013 | Lentzitzky | |
| 2013/0254296 A1* | 9/2013 | Lai | G06Q 10/10 709/205 |
| 2013/0275222 A1 | 10/2013 | Amaro et al. | |
| 2013/0290414 A1 | 10/2013 | Rait et al. | |
| 2013/0290426 A1 | 10/2013 | Sorenson | |
| 2013/0325745 A1 | 12/2013 | Kelly et al. | |
| 2013/0346329 A1 | 12/2013 | Alib-Bulatao et al. | |
| 2014/0137147 A1 | 5/2014 | Moran et al. | |
| 2014/0223464 A1* | 8/2014 | Moran | H04N 21/42208 725/12 |
| 2014/0244689 A1 | 8/2014 | Prabaker et al. | |
| 2014/0244751 A1 | 8/2014 | Tseng | |
| 2014/0259038 A1 | 9/2014 | Belyaev et al. | |
| 2014/0282656 A1* | 9/2014 | Belyaev | H04N 21/4751 725/59 |
| 2015/0058757 A1* | 2/2015 | Tseng | H04N 21/4758 715/753 |

OTHER PUBLICATIONS

Notice of Allowance dated Feb. 8, 2018 in U.S. Appl. No. 14/081,760.
Notice of Allowance dated Apr. 5, 2019 in U.S. Appl. No. 15/988,778.
Notice of Allowance dated Aug. 17, 2021 in U.S. Appl. No. 16/534,681.
Office Action dated Mar. 3, 2021 in U.S. Appl. No. 16/534,681.
Office Action dated Mar. 7, 2017 in U.S. Appl. No. 14/081,760.
Office Action dated Apr. 29, 2016 in U.S. Appl. No. 14/081,760.
Office Action dated Jun. 15, 2017 in U.S. Appl. No. 14/081,760.
Office Action dated Jul. 23, 2020 in U.S. Appl. No. 16/534,681.
Office Action dated Sep. 2, 2016 in U.S. Appl. No. 14/081,760.
Office Action dated Sep. 17, 2015 in U.S. Appl. No. 14/081,760.
Office Action dated Oct. 4, 2018 in U.S. Appl. No. 15/988,778.
Office Action dated Nov. 13, 2020 in U.S. Appl. No. 16/534,681.

* cited by examiner

GROUP CURATED MEDIA CHANNELS

CROSS-REFERENCE TO RELATED APPLICATIONS

This application is a continuation of U.S. patent application Ser. No. 16/534,681, filed Aug. 7, 2019, which is a continuation of U.S. patent application Ser. No. 15/988,778, filed May 24, 2018, which is a continuation of U.S. patent application Ser. No. 14/081,760, filed Nov. 15, 2013, each of which is hereby incorporated by reference herein in its entirety.

TECHNICAL FIELD

This disclosure relates to system(s) and method(s) that facilitate group curated media channels.

BACKGROUND

The internet and media enabled portable computing devices have dramatically altered the processes for generating and consuming media content. Additionally, the convenience of being able to upload, consume and/or share media content via the internet, essentially on demand, has resulted in explosive growth of internet media consumption. Presently, users can generate media content using numerous types of devices, e.g., computers, cellular phones, cameras, portable computing devices, etc. Furthermore, users can upload media content from virtually anywhere at any time, as long as they have access to media capable device(s) with an internet connection. For example, millions (if not billions) of people around the world have capability to produce media content, and popular online media services (e.g., service providers) can receive many hours of newly uploaded user-generated content every minute. However, in general, conventional online media services (e.g., conventional service providers) simply allow a user to upload and/or share media content so that other users can consume the media content.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes an identification component, a generation component and a permissions component. The identification component identifies a first set of media content associated with a first social group and a second set of media content associated with a second social group. The generation component generates a media channel based on the first and second sets of media content identified as being respectively associated with the first and second social groups. The permissions component grants access to the media channel based at least on permissions generated for the first and second sets of media content in connection with the respective first and second social groups.

In accordance with another implementation, a system includes an identification component, a generation component and a permissions component. The identification component identifies at least first media content generated by a first user of a social group and second media content generated by a second user of the social group. The generation component generates a media channel based on the first and second media content identified as being respectively associated with the social group. The permissions component grants access to the media channel based on permissions generated for the social group.

In accordance with yet another implementation, a method provides for identifying a first set of media content associated with a first social group, identifying a second set of media content associated with a second social group, generating a media channel based on the first and second sets of media content identified as being respectively associated with the first and second social groups, and granting access to the media channel based at least on permissions generated for the first and second sets of media content in connection with the respective first and second social groups.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
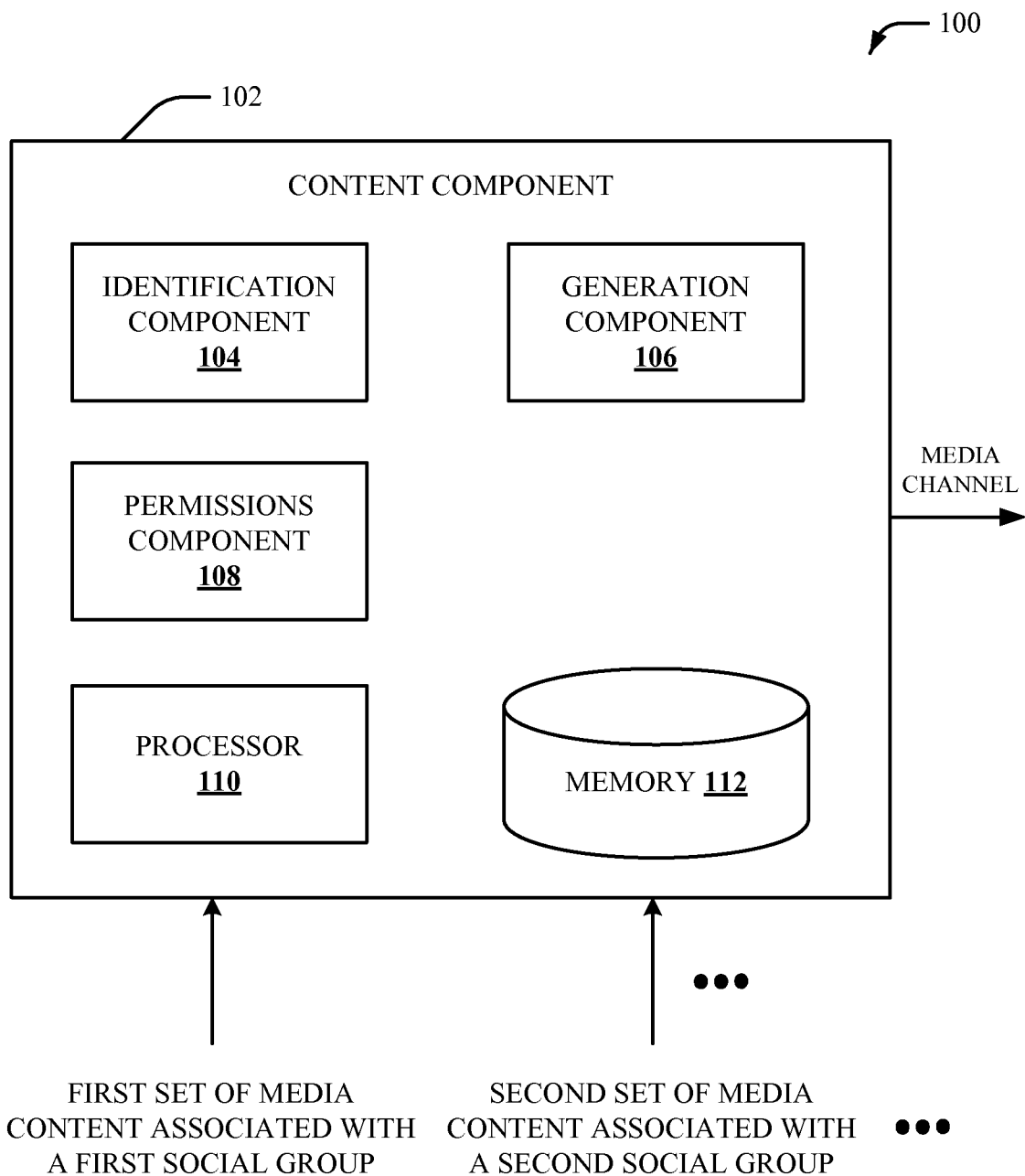
FIG. 1 illustrates a high-level block diagram of an example system for collaboratively generating and/or managing a media channel, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio content and/or video content) to a server (e.g., a media content server). The media content can then be delivered (e.g., streamed) to other users. Service providers can provide network infrastructure for users to upload media content to the server (e.g., the media content server) and/or for users to consume media content uploaded to the server (e.g., the media content server). In some instances, a user (e.g., a single media creator) can create a media channel that includes media content generated and/or uploaded by the user (e.g., the single media creator). However, conventional service providers simply allow the user (e.g., the single media creator) to upload and/or share the uploaded media content via the media channel so that other users (e.g., other users that did not generate and/or upload the media content associated with the media channel) can consume (e.g., view) the uploaded media content via the media channel.

To that end, techniques for collaboratively generating and/or managing a media channel are disclosed. As such, media content for a media channel can be collaboratively generated, selected, organized and/or grouped (e.g., a media channel can be associated with multiple media creators). In an aspect, a social group (e.g., a social circle, a social community, etc.) can generate (e.g., submit, contribute, etc.) and/or receive (e.g., consume, view, etc.) media content from a media channel. In one example, a social group can be associated with a social networking service and a media channel can be associated with a media sharing service. In another example, a social group can be generated by combining (e.g., merging) a plurality of social groups. As such, a group media channel (e.g., a community media channel) can be generated. Accordingly, a media channel and/or media channel subscriptions can be curated as a function of one or more social groups. In an aspect, one or more permissions associated with a social group can be applied to media content in a media channel that is generated, selected, organized and/or grouped by the social group. Therefore, contributors to a media channel can also be consumers of the media channel. Additionally, the media channel can provide media content that is asynchronously generated and/or asynchronously consumed.

Referring initially to FIG. 1, there is illustrated an example system 100 that can facilitate collaboration for generating and/or managing a media channel, according to an aspect of the subject disclosure. In an aspect, the system 100 can be implemented on or in connection with one or more servers that host user-uploaded media content. For example, the system 100 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like. In another aspect, the system 100 can be implemented on or in connection with a media capable device. For example, the system 100 can be implemented on or in connection with a cellular phone (e.g., a smartphone), a tablet, a personal computer (PC), a desktop computer, a laptop computer, a television (e.g., an interactive television, an internet-connected television, etc.), a personal digital assistant (PDA), an electronic reader (e-reader), a camera, a portable computing device, a set-top box, a streaming media device, a gaming device, another media capable device, etc.

Specifically, the system 100 can provide a content component with an identification feature (e.g., identification component 104), a generation feature (e.g., generation component 106) and a permissions feature (e.g., permissions component 108) that can be utilized in, for example, a media content application. The identification feature identifies a first set of media content associated with a first social group and a second set of media content associated with a second social group. The generation feature generates a media channel based on the first and second sets of media content identified as being respectively associated with the first and second social groups. The permission feature grants access to the media channel based at least on permissions generated for the first and second sets of media content in connection with the respective first and second social groups.

In particular, the system 100 can include a content component 102 that includes at least an identification component 104, a generation component 106 and a permissions component 108. In an aspect, content component 102 can be associated with a media provider (e.g., a media sharing provider). Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The identification component 104 can identify and/or receive media content associated with one or more social groups (e.g., social circles, social communities, etc.). For example, the identification component 104 can identify and/or receive a first set of media content associated with a first social group (e.g., a first social circle, a first social community, etc.). In one example, the first set of media content can include one or more videos. However, it is to be appreciated that the first set of media content can additionally or alternatively include other types of media content. The first social group can be associated with a social networking service. For example, the first social group can be a social circle associated with a social networking service. In another example, the first social group can be a social community associated with a social networking service. As such, the first social group can include (e.g., be associated with) one or more individuals (e.g., users, members, account holders, etc.) associated with the social networking service. Each of the one or more individuals associated with the first social group can be associated with a user account (e.g., a unique user account for the social networking service). In an aspect, at least a portion of the first set of media content can be generated and/or uploaded by one or more individuals (e.g., users, members, account holders, etc.) included in the first social group. For example, at least one video can be included in the first social group. In another aspect, the first set of media content can be recommended (e.g., shared, liked, marked, classified, etc.) by an individual (e.g., user, member, account holder, etc.) associated with the first social group. For example, at least one video can be recommended by a user that generated the first social group or a user that is included in the first social group. In an aspect, the first set of media content can be stored in a database (e.g., a content database, a content server, etc.) associated with a social networking service. In another aspect, the first set of media content can be stored in a database (e.g., a content database, a content server, etc.) associated with a media sharing service.

Additionally, the identification component 104 can identify and/or receive a second set of media content associated with a second social group (e.g., a second social circle, a second social community, etc.). In one example, the second set of media content can include one or more videos. However, it is to be appreciated that the second set of media content can additionally or alternatively include other types of media content. The second social group can be associated with a social networking service. For example, the second social group can be a social circle associated with a social networking service. In another example, the second social group can be a social community associated with a social networking service. As such, the second social group can include (e.g., be associated with) one or more individuals (e.g., users, members, account holders, etc.) associated with the social networking service. Each of the one or more individuals associated with the second social group can be associated with a user account (e.g., a unique user account for the social networking service). In an aspect, at least a portion of the second set of media content can be generated and/or uploaded by one or more individuals (e.g., users, members, account holders, etc.) included in the second social group. For example, at least one video can be included in the second social group. In another aspect, the second set of media content can be recommended (e.g., shared, liked, marked, classified, etc.) by an individual (e.g., user, member, account holder, etc.) associated with the second social group. For example, at least one video can be recommended by a user that generated the second social group or a user that is included in the second social group. In an aspect, the second set of media content can be stored in a database (e.g., a content database, a content server, etc.) associated with a social networking service. In another aspect, the second set of media content can be stored in a database (e.g., a content database, a content server, etc.) associated with a media sharing service.

It is to be appreciated that the identification component 104 can additionally or alternatively identify and/or receive a third set of media content associated with a third social group, a fourth set of media content associated with a fourth social group, etc. Media content (e.g., a media file) can include but is not limited to a video (e.g., a video file, a video clip, a video sample, etc.), an image (e.g., an image file, a picture, a thumbnail, etc.), audio (e.g., an audio file, an audio clip, an audio sample, etc.), an electronic book (e-book), a video game and/or other user-generated content. It is also to be appreciated that media content can be in any recognizable and suitable media file format (e.g., video file format, image file format, audio file format, etc.), codec compression format, etc. In an aspect, media content can be stored in a content database (e.g., a content database associated with a social networking service and/or a media sharing service).

Each individual (e.g., user, member, account holder, etc.) associated with a social group (e.g., first social group, second social group, third social group, etc.) can be associated with at least one computing device, such as but not limited to, a cellular phone (e.g., a smartphone), a tablet, a personal computer (PC), a desktop computer, a laptop computer, a personal digital assistant (PDA), an electronic reader (e-reader), a camera, a media capable device, a portable computing device, an interactive television, an internet-connected television, a set-top box, a streaming media device, a gaming device, another computing device, etc. As such, an individual (e.g., user, member, account holder, etc.) associated with a social group can generate, upload and/or recommend media content via at least one computing device. In an aspect, an individual (e.g., user, member, account holder, etc.) associated with a social group can generate, upload and/or recommend media content (e.g., using at least one computing device) via a network(s). Network(s) can include wired and wireless networks, including but not limited to, a cellular network, a wide area network (WAN, e.g., the Internet), a local area network (LAN), or a personal area network (PAN). As such, an individual (e.g., user, member, account holder, etc.) associated with a social group can generate, upload and/or recommend media content (e.g., using at least one computing device) via virtually any desired wired or wireless technology, including, for example, cellular, WAN, wireless fidelity (Wi-Fi), Wi-Max, WLAN, etc.

In an aspect, the identification component 104 can identify media content associated with one or more social groups in response to a user action. For example, the identification component 104 can identify the first set of media content associated with the first social group and/or the second set of media content associated with the second social group in response to a user action. In one example, the identification component 104 can identify the first set of media content associated with the first social group and/or the second set of media content associated with the second social group in response a user selecting (e.g., clicking and/or dragging via a user interface on a computing device) the first social group and/or the second social group (e.g., a user desires to generate a media channel that includes media content associated with the first social group and/or the second social group). In another aspect, the identification component 104 can determine and/or identify one or more accounts (e.g., users accounts) associated with the first social group and/or the second social group. In yet another aspect, the identification component 104 can determine and/or identify one or more computing devices associated with the first social group and/or the second social group.

The generation component 106 can generate and/or modify a media channel based on media content associated with one or more social groups. In an aspect, the generation component 106 can generate and/or modify a media channel based on the first set of media content associated with the first social group and at least the second set of media content associated with the second social group. In one example, the first set of media content associated with the first social group and at least the second set of media content associated with the second social group can be combined and/or provided via a media channel (e.g., a new media channel). In another example, the first set of media content associated with the first social group and at least the second set of media content associated with the second social group can be added to a media channel (e.g., a preexisting media channel). Furthermore, media content included in the media channel generated by the generation component 106 can be associated with multiple devices and/or multiple user accounts. In an aspect, the first social group and/or the second social group can be associated with a social networking service, and the media channel can be associated with a media sharing service. In another aspect, the generation component 106 can maintain attribution of particular media content included in the media channel to an individual (e.g., user, member, an account holder, etc.) that contributed the particular media content to the media channel. For example, an individual (e.g., user, member, account holder, etc.) that generated, uploaded and/or recommended particular media content for a social group (e.g., the first social group, the second social group, etc.) can be associated with that particular media content when added to the media channel.

In an aspect, the generation component 106 can generate a new social group associated with the media channel (e.g., the media channel generated based on media content associated with one or more social groups). For example, the new social group can include at least individuals (e.g., users, members, account holders, etc.) associated with the first social group and/or the second social group. In another example, the new social group can include a portion of individuals (e.g., users, members, account holders, etc.) associated with the first social group and/or the second social group. However, it is to be appreciated that the new social group can include other individuals (e.g., users, members, account holders, etc.) not associated with the first social group and/or the second social group. In yet another aspect, the generation component 106 can generate a media stream based on the first set of media content and at least the second set of media content. For example, media content included the first set of media content and at least the second set of media content can be aggregated to generate at least one media stream. In an aspect, the media channel can be presented on a webpage and/or via a network-connected application. In one example, the media channel can be a home page (e.g., a home page for a media sharing service) associated with a social group (e.g., the first social group, the second social group, the new social group, etc.). As such, the media channel can provide media content that is asynchronously generated by individuals (e.g., users, members, account holders, etc.) associated with one or more social groups (e.g., the first social group, the second social group, the new social group, etc.). Furthermore, the media channel can provide an environment for asynchronously consuming the media content that is asynchronously generated by individuals (e.g., users, members, account holders, etc.) associated with one or more social groups (e.g., the first social group, the second social group, the new social group, etc.).

The permissions component 108 can generate one or more permissions for the media channel (e.g., media content included in the media channel) as a function of one or more permissions associated with the first social group and/or the second social group. For example, the permissions component 108 can grant access to the media channel based at least on permissions generated for the first set of media content associated with the first social group and the second set of media content associated with the second social group. In one example, the permissions component 108 can facilitate rights management (e.g., access rights, augmentation rights, distribution rights, etc.) for the media channel (e.g., media content included in the media channel) as a function of one or more permissions associated with the first social group and/or the second social group (e.g., the first set of media content and/or the second set of media content). In another example, the permissions component 108 can establish and/or maintain permissions (e.g., privileges, authorizations, licenses, access levels, etc.) for one or more individuals (e.g., users, members, account holders, etc.) associated with the media channel as a function of one or more permissions associated with the first social group and/or the second social group. As such, contributors to the media channel can also be consumers of the media channel.

In one example, the permissions component 108 can grant access (e.g., one or more access rights) for the media channel to one or more individuals (e.g., users, members, account holders, etc.) associated with the first social group and/or the second social group. In another example, the permissions component 108 can grant access to the media channel to one or more individuals (e.g., users, members, account holders, etc.) not associated with the first social group and/or the second social group. In yet another example, the permissions component 108 can block one or more individuals (e.g., users, members, account holders, etc.), not associated with the first social group and/or the second social group, from accessing the media channel. In one example, the permissions component 108 can assign a list of permissions (e.g., an access control list) assigned to the first social group and/or the second social group to the media channel. As such, the media channel can inherit one or more permissions assigned to the first social group and/or the second social group (e.g., the first set of media content and/or the second set of media content).

Additionally or alternatively, the permissions component 108 can grant augmentation rights for the media channel based at least on permissions generated for the first set of media content and the second set of media content. In one example, the permissions component 108 can allow one or more individuals (e.g., users, members, account holders, etc.), not associated with the first social group or the second social group, to augment the media channel. In another example, the permissions component 108 can block one or more different individuals (e.g., different users, different members, different account holders, etc.), not associated with the first social group or the second social group, from augmenting the media channel.

Additionally or alternatively, the permissions component 108 can generate and/or grant different permissions for the media channel that are not assigned to the first set of media content associated with the first social group and the second set of media content associated with the second social group. In one example, the first social group and/or the second social group can be a private social group and the generated media channel can be a public media channel. In another example, the first social group and/or the second social group can be a public social group and the generated media channel can be a private media channel. Furthermore, the permissions component 108 can modify one or more permissions generated for the media channel. For example, one or more permissions generated for the first set of media content and/or the second set of media content can be modified (e.g., in response to user input) to generate different permissions for the media channel. As such, different permissions can be generated and/or granted for the media channel that are not assigned to the first set of media content and/or the second set of media content (e.g., not assigned to the first social group and/or the second social group).

In aspect, the permissions component 108 can associate the media channel with a new social group. For example, the generation component 106 and/or the permissions component 108 can generate a new social group that generates, contributes, selects, organizes, groups, maintains and/or distributes media content associated with the media channel. In another aspect, the identification component 104 can identify at least first media content generated by a first individual (e.g., first user, first member, first account holder, etc.) of a social group (e.g., the first social group) and second media content generated by a second individual (e.g., second user, second member, second account holder, etc.) of the social group (e.g., the first social group). The generation component 106 can generate a media channel based on the first media content and/or the second media content. The permissions component 108 can grant access to the media channel based on permissions generated for the social group (e.g., the first social group). In one example, the permissions component 108 can generate permissions to allow the first individual and the second individual to access the media channel. In another example, the permissions component 108 can generate permissions to allow the first individual to access the media channel and block the second individual from accessing the media channel. In yet another example, the permissions component 108 can generate permissions to allow a third user to generate third media content for the social group and/or access the media channel. In yet another example, the permissions component 108 can generate permissions to block a third user from generating third media content for the social group and/or accessing the media channel.

In a non-limiting example, one or more social groups can be associated with an event (e.g., a party, a vacation, a sporting competition, etc.). One or more individuals (e.g., users, members, account holders, etc.) in each of the one or more social groups can generate media content (e.g., one or more videos) associated with the event. As such, the identification component 104 can identify and/or receive the media content associated with the event (e.g., the media content generated by the one or more individuals in the one or more social groups). Furthermore, the generation component 106 can generate a media channel based on the media content generated by the one or more individuals in the one or more social groups. Additionally, the permissions component 108 can grant access and/or modifications to the media channel based at least on permissions assigned to the media content generated by the one or more individuals in the one or more social groups and/or permissions assigned to the one or more social groups. As such, each of the individuals in the one or more social groups associated with the event can consume and/or manage media content associated with the media channel. Moreover, the media content included in the media channel can be associated with multiple computing devices and/or user accounts (e.g., computing devices and/or user accounts associated with the individuals included in the one or more social groups associated with the event).

While FIG. 1 depicts separate components in system 100, it is to be appreciated that the components may be implemented in a common component. For example, the identification component 104, the generation component 106 and/or the permissions component 108 can be included in a single component. Further, it can be appreciated that the design of system 100 can include other component selections, component placements, etc., to facilitate collaboration for generating a media channel.

Figure 2:
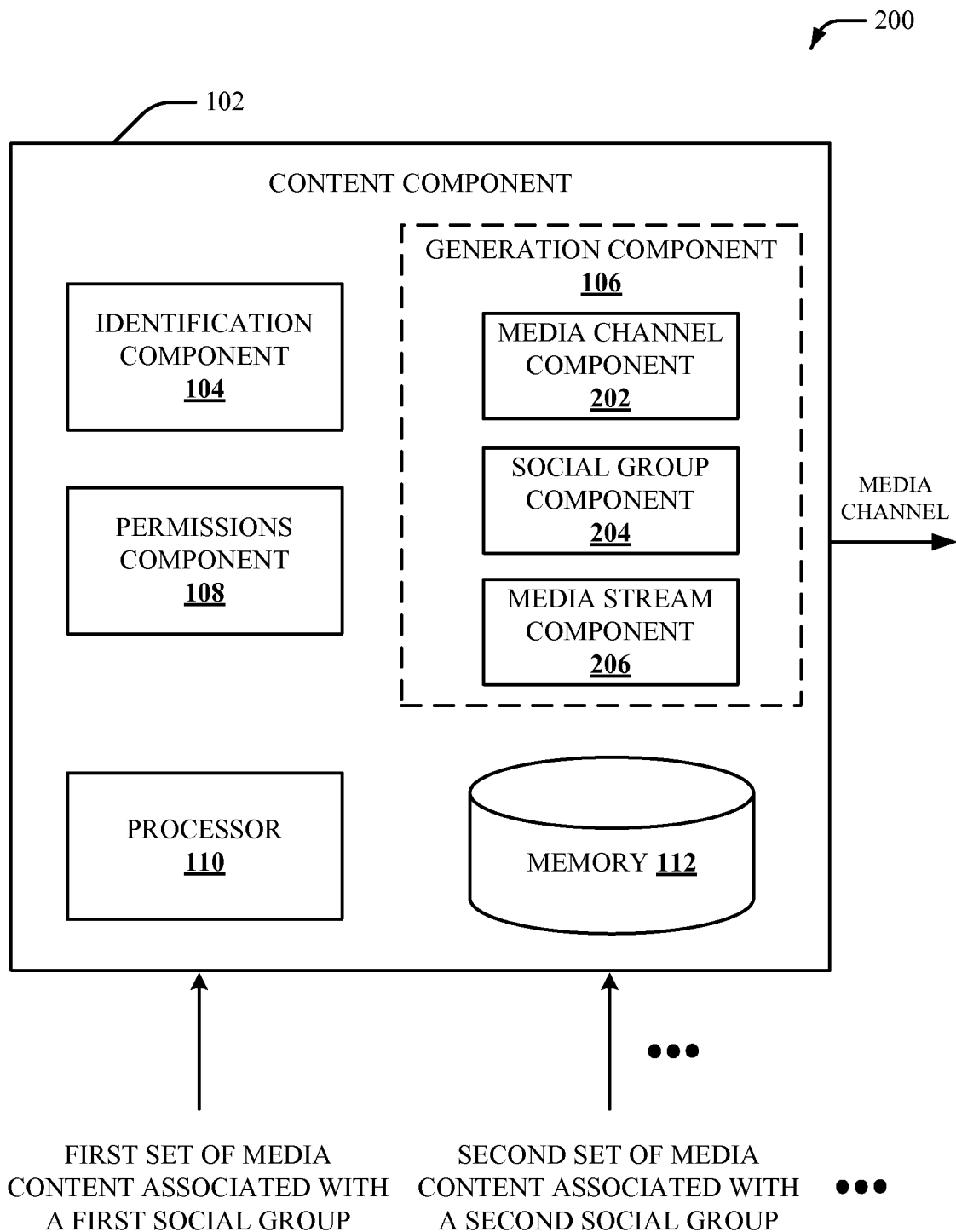
FIG. 2 illustrates a high-level block diagram of an example system for generating a media channel, a social group and/or a media stream, in accordance with various aspects and implementations described herein.

FIG. 2 illustrates a non-limiting implementation of a system 200 in accordance with various aspects and implementations of this disclosure. The system 200 includes content component 102. The content component 102 can include the identification component 104, the generation component 106 and/or the permissions component 108. The generation component 106 can include a media channel component 202, a social group component 204 and/or a media stream component 206.

The media channel component 202 can generate a media channel. The media channel generated by the media channel component 202 can be associated with multiple devices and/or multiple user accounts. For example, the media channel component 202 can generate a media channel based on at least the first set of media content associated with the first social group and the second set of media content associated with the second social group. Additionally or alternatively, the media channel component 202 can modify a media channel. For example, the media channel component 202 can add or remove media content associated with the first social group and/or the second social group to a preexisting media channel. In one example, the media channel component 202 can combine the first set of media content associated with the first social group and at least the second set of media content associated with the second social group. The media channel component 202 can then provide the first set of media content associated with the first social group and at least the second set of media content associated with the second social group via a media channel (e.g., a new media channel). In another example, the media channel component 202 can add the first set of media content associated with the first social group and at least the second set of media content associated with the second social group to a media channel (e.g., a preexisting media channel). As such, media content that is generated, uploaded and/or grouped asynchronously can be viewed as a collection (e.g., a grouping) of media content via the media channel. Furthermore, media content contributors can curate a media channel without sharing an account (e.g., an account associated with a media channel).

In an aspect, the media channel can be an environment for contributing and/or consuming media content. For example, the media channel can be displayed as a webpage and/or via a network-connected application. In one example, the media channel can be a home page (e.g., a home page for a media sharing service) associated with a social group (e.g., the first social group, the second social group, the new social group, etc.). As such, the media channel can provide media content that is asynchronously generated by individuals (e.g., users, members, account holders, etc.) associated with one or more social groups (e.g., the first social group, the second social group, the new social group, etc.). Furthermore, the media channel can provide an environment for asynchronously consuming the media content that is asynchronously generated by individuals (e.g., users, members, account holders, etc.) associated with one or more social groups (e.g., the first social group, the second social group, the new social group, etc.).

The social group component 204 can generate a new social group. For example, the social group component 204 can generate a new social group associated with the media channel generated by the media channel component 202. As such, the social group component 204 can generate a new social group based on one or more social groups associated with the media channel generated by the media channel component 202 (e.g., the first social group and/or the second social group). Furthermore, the new social group can be assigned permissions that are previously assigned to one or more social groups (e.g., the first social group and/or the second social group) that contributed media content to the media channel. Additionally or alternatively, the new social group can be assigned permissions that are not previously assigned to one or more social groups (e.g., the first social group and/or the second social group) that contributed media content to the media channel.

The media stream component 206 can generate one or more media streams based on the first set of media content associated with the first social group and the second set of media content associated with the second social group. For example, the media stream component 206 can aggregate media content included in the first set of media content and the second set of media content (e.g., associated with the first social group and the second social group) to generate one or more media streams. In an aspect, the media stream component 206 can generate a media stream based on the media channel generated by the media channel component 202 (e.g., media content included in the media channel generated by the media channel component 202). As such, a collection of media content that is generated, uploaded and/or grouped asynchronously (e.g., by one or more social groups) can be combined into one or more media streams.

Figure 3:
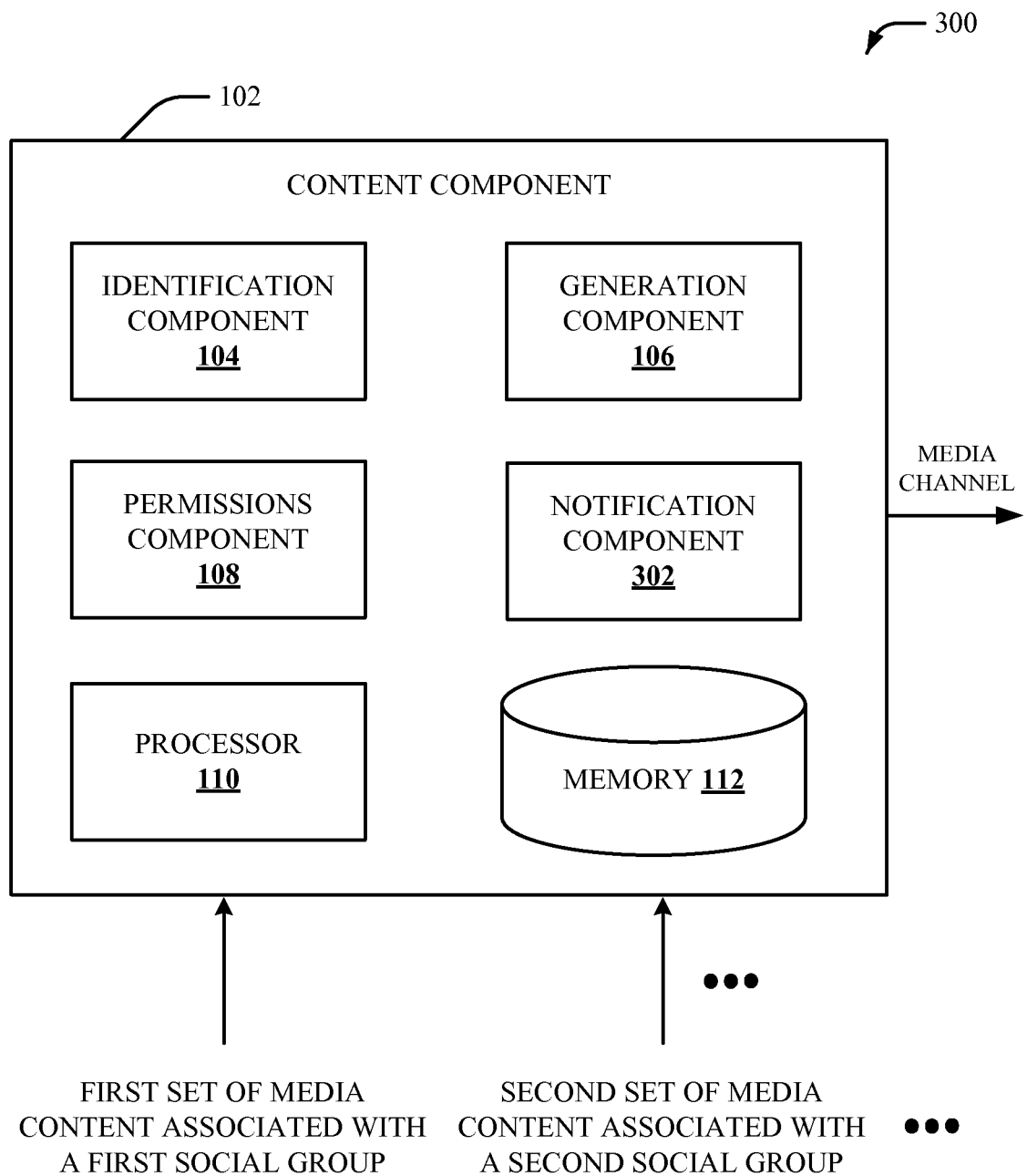
FIG. 3 illustrates a high-level block diagram of another example system for collaboratively generating and/or managing a media channel, in accordance with various aspects and implementations described herein.

FIG. 3 illustrates a non-limiting implementation of a system 300 in accordance with various aspects and implementations of this disclosure. The system 300 includes content component 102. The content component 102 can include the identification component 104, the generation component 106, the permissions component 108 and/or a notification component 302. The generation component 106 can include the media channel component 202, the social group component 204 and/or the media stream component 206.

The notification component 302 can generate a notification (e.g., a notification message) associated with the media channel generated by the generation component 106 (e.g., the media channel component 202). In one example, the notification component 302 can generate a notification associated with a social group (e.g., the first social group, the second social group, the new social group, etc.). For example, a link to the media channel can be posted on a social wall and/or a news feed associated with a social group (e.g., the first social group, the second social group, the new social group, etc.). In another example, the notification component 302 can generate an email notification that includes a link to the media channel. In yet another example, the notification component 302 can generate a short message service (SMS) notification that includes a link to the media channel.

Figure 4:
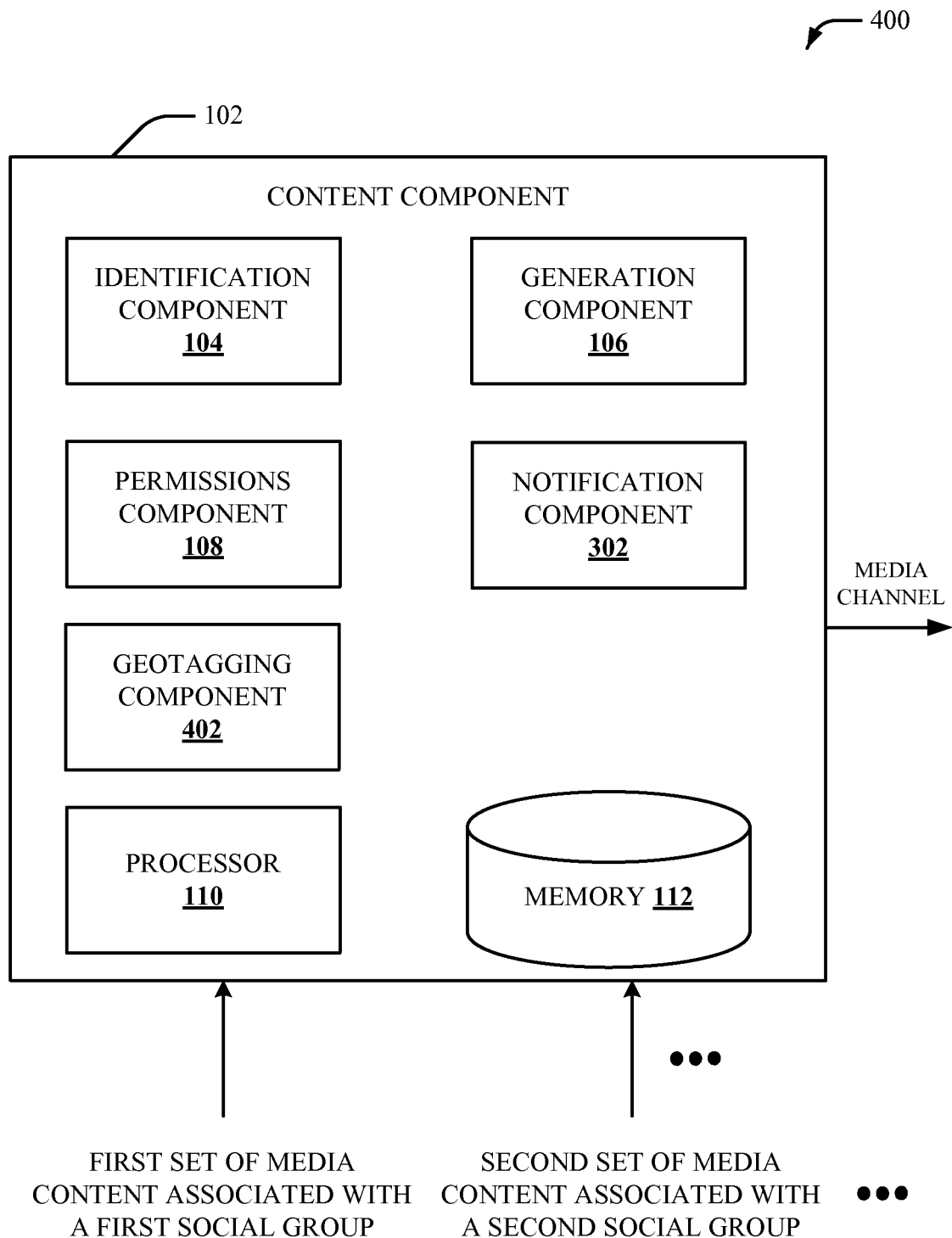
FIG. 4 illustrates a high-level block diagram of yet another example system for collaboratively generating and/or managing a media channel, in accordance with various aspects and implementations described herein.

FIG. 4 illustrates a non-limiting implementation of a system 400 in accordance with various aspects and implementations of this disclosure. The system 400 includes content component 102. The content component 102 can include the identification component 104, the generation component 106, the permissions component 108, the notification component 302 and/or a geotagging component 402. The generation component 106 can include the media channel component 202, the social group component 204 and/or the media stream component 206.

The geotagging component 402 can determine a geographical location of one or more individuals (e.g., users, members, account holders, etc.) associated with a social group (e.g., the first social group, the second social group, the new social group, etc.). In an aspect, the permissions component 108 can generate permissions for consumers of the media channel based on the geographical location of the one or more users determined by the geotagging component 402. For example, the permissions component 108 can grant access to the media channel based on a geographical location of one or more users determined by the geotagging component 402. In one example, only individuals (e.g., users, members, account holders, etc.) within a certain range (e.g., within a certain area, within a certain Wi-Fi network, etc.) and included in a social group (e.g., the first social group, the second social group, the new social group, etc.) can be granted access to the media channel. In another aspect, the notification component 302 can generate a notification message for one or more individuals (e.g., users, members, account holders, etc.) based on the geographical location of the one or more individuals determined by the geotagging component 402. In one example, the notification component 302 can generate a notification message for individuals (e.g., users, members, account holders, etc.) within a certain range (e.g., within a certain area, within a certain Wi-Fi network, etc.) and included in a social group (e.g., the first social group, the second social group, the new social group, etc.).

Figure 5:
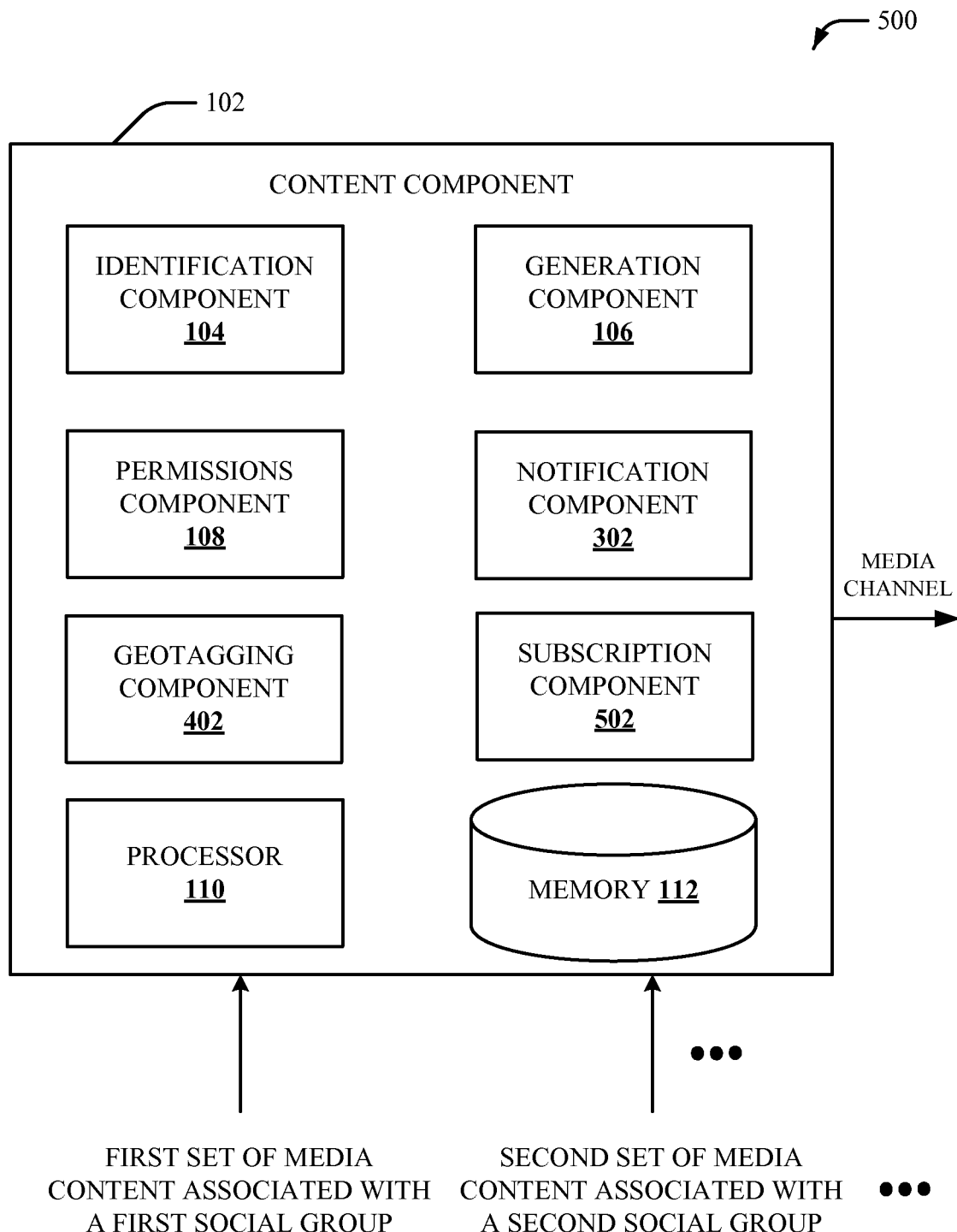
FIG. 5 illustrates a high-level block diagram of yet another example system for collaboratively generating and/or managing a media channel, in accordance with various aspects and implementations described herein.

FIG. 5 illustrates a non-limiting implementation of a system 500 in accordance with various aspects and implementations of this disclosure. The system 500 includes content component 102. The content component 102 can include the identification component 104, the generation component 106, the permissions component 108, the notification component 302, a geotagging component 402 and/or a subscription component 502. The generation component 106 can include the media channel component 202, the social group component 204 and/or the media stream component 206.

The subscription component 502 can generate one or subscriptions associated with the media channel. For example, the subscription component 502 can subscribe (e.g., automatically subscribe) individuals (e.g., users, members, account holders, etc.) included in a social group associated with the media channel (e.g., the first social group, the second social group, the new social group, etc.) to the media channel. As such, individuals (e.g., users, members, account holders, etc.) included in a social group associated with the media channel (e.g., the first social group, the second social group, the new social group, etc.)

can automatically have access to the media channel, automatically follow the media channel and/or automatically receive updates from the media channel. Therefore, individuals (e.g., users, members, account holders, etc.) that have contributed media content to the media channel and/or are included in a social group associated with the media channel are not required to perform an action to subscribe to the media channel. In an aspect, the subscription component 502 and/or the notification component 302 can provide an option to individuals (e.g., users, members, account holders, etc.) included in a social group associated with the media channel to subscribe or unsubscribe to the media channel.

Figure 6:
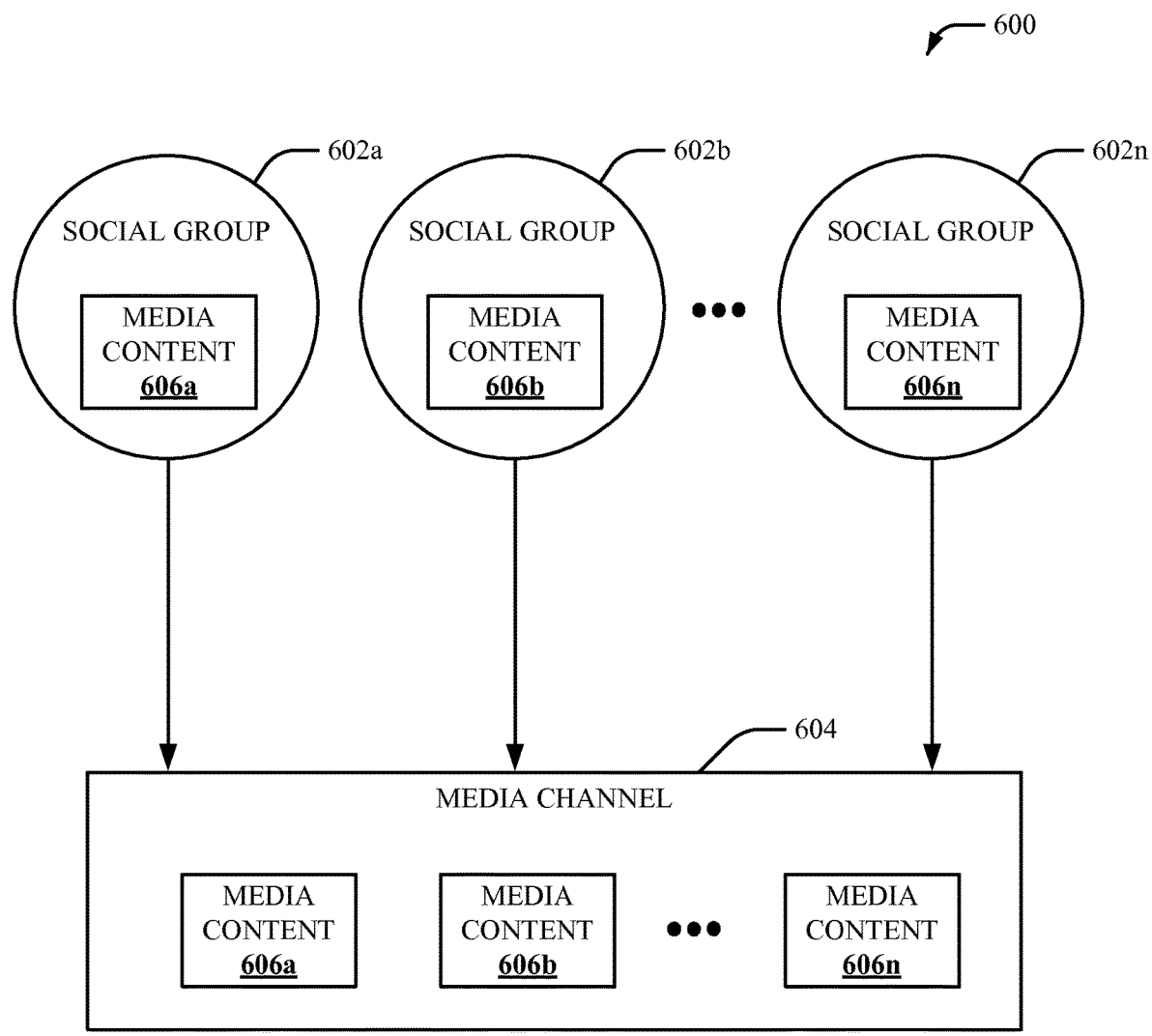
FIG. 6 illustrates example system for generating a media channel associated with one or more social groups, in accordance with various aspects and implementations described herein.

Referring to FIG. 6, there is illustrated a system 600 in accordance with various aspects and implementations of this disclosure. System 600 includes social groups 602a-n and a media channel 604. Each of the social groups can include media content. For example, social group 602a can include media content 606a, social group 602b can include media content 606b, social group 602n can include media content 606n, etc. Media content can include but is not limited to a video (e.g., a video file, a video clip, a video sample, etc.), an image (e.g., an image file, a picture, a thumbnail, etc.), audio (e.g., an audio file, an audio clip, an audio sample, etc.), an electronic book (e-book), a video game and/or other user-generated content. For example, each media content 606a-n can include one or more videos. Each of the social groups 602a-n can be a social circle and/or a social community. For example, each of the social groups 602a-n can be a social circle and/or a social community associated with a social networking service. Furthermore, each of the social groups 602a-n and/or each of the media content 606a-n can be associated with one or more permissions.

In an aspect, media content can be generated and/or uploaded by a user associated with a social group. For example, at least a portion of the media content 606a can be generated and/or uploaded by a user that generated the social group 602a. In another example, at least a portion of the media content 606a can be generated and/or uploaded by a user included in the social group 602a. In another aspect, media content can be recommended (e.g., marked, classified, etc.) by a user in a social group. For example, at least a portion of the media content 606a can be recommended (e.g., marked, classified, etc.) by a user that generated the social group 602a and/or by a user included in the social group 602a. As such, media content 606a can include media content that is generated and/or uploaded by a user not associated with the social group 602a.

The media channel 604 can be generated based on the media content 606a-n (e.g., the media content 606a-n associated with the social groups 602a-n). For example, the media channel 604 can include at least a portion of the media content 606a, at least a portion of the media content 606b, at least a portion of the media content 606n, etc. Therefore, contributors to the media channel 604 (e.g., individuals associated with social groups 602a-n) can also be consumers of the media channel 604. Access granted to the media channel 604 can be granted based at least on the one or more permissions assigned to the social groups 602a-n and/or the media content 606a-n. For example, access permissions assigned to the media channel 604 can be inherited from the social groups 602a-n and/or the media content 606a-n. Furthermore, augmentation permissions can be assigned to the media channel 604 based at least on the one or more permissions assigned to the social groups 602a-n and/or the media content 606a-n. For example, augmentation permissions assigned to the media channel 604 can be inherited from the social groups 602a-n and/or the media content 606a-n. However, it is to be appreciated that other types of permissions can additionally or alternatively be assigned to the media channel 604. As such, media content (e.g., media content 606a-n) associated with one or more social groups (e.g., social groups 602a-n) can be combined and/or provided via a media channel (e.g., media channel 604).

Figure 7:
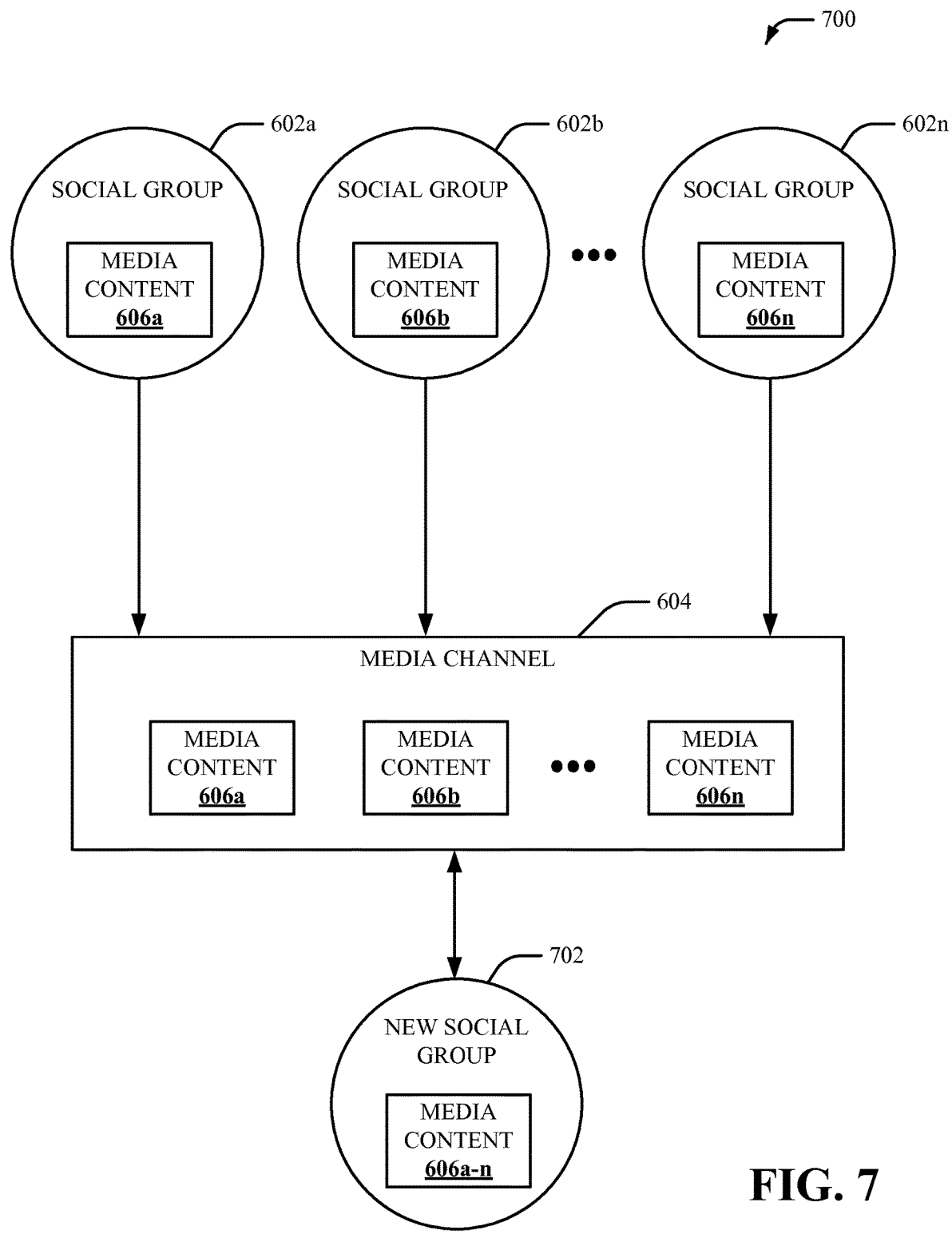
FIG. 7 illustrates an example system for generating a new social group associated with a media channel, in accordance with various aspects and implementations described herein.

Referring to FIG. 7, there is illustrated a system 700 in accordance with various aspects and implementations of this disclosure. System 700 includes the social groups 602a-n and the media channel 604. Each of the social groups can include media content. For example, social group 602a can include media content 606a, social group 602b can include media content 606b, social group 602n can include media content 606n, etc. Furthermore, system 700 includes a new social group 702. The new social group 702 can be associated with the media channel 604. Furthermore, the new social group 702 can be generated as a function of the social groups 602a-n. For example, the social groups 602a-n can be combined to generate the new social group 702. Accordingly, media content (e.g., media content 606a-n) associated with social groups 602a-n and/or the media channel 604 can be associated with the new social group 702. Furthermore, permissions for the new social group 702 can be generated as a function of permissions assigned to the social groups 602a-n and/or the media channel 604 (e.g., the media content 606a-n). In an aspect, the new social group 702 can contribute media content (e.g., the media content 606a-n, new media content, etc.) to the media channel 604, remove media content from the media channel 604, consume media content associated with the media channel 604 and/or manage the media channel 604.

Figure 8:
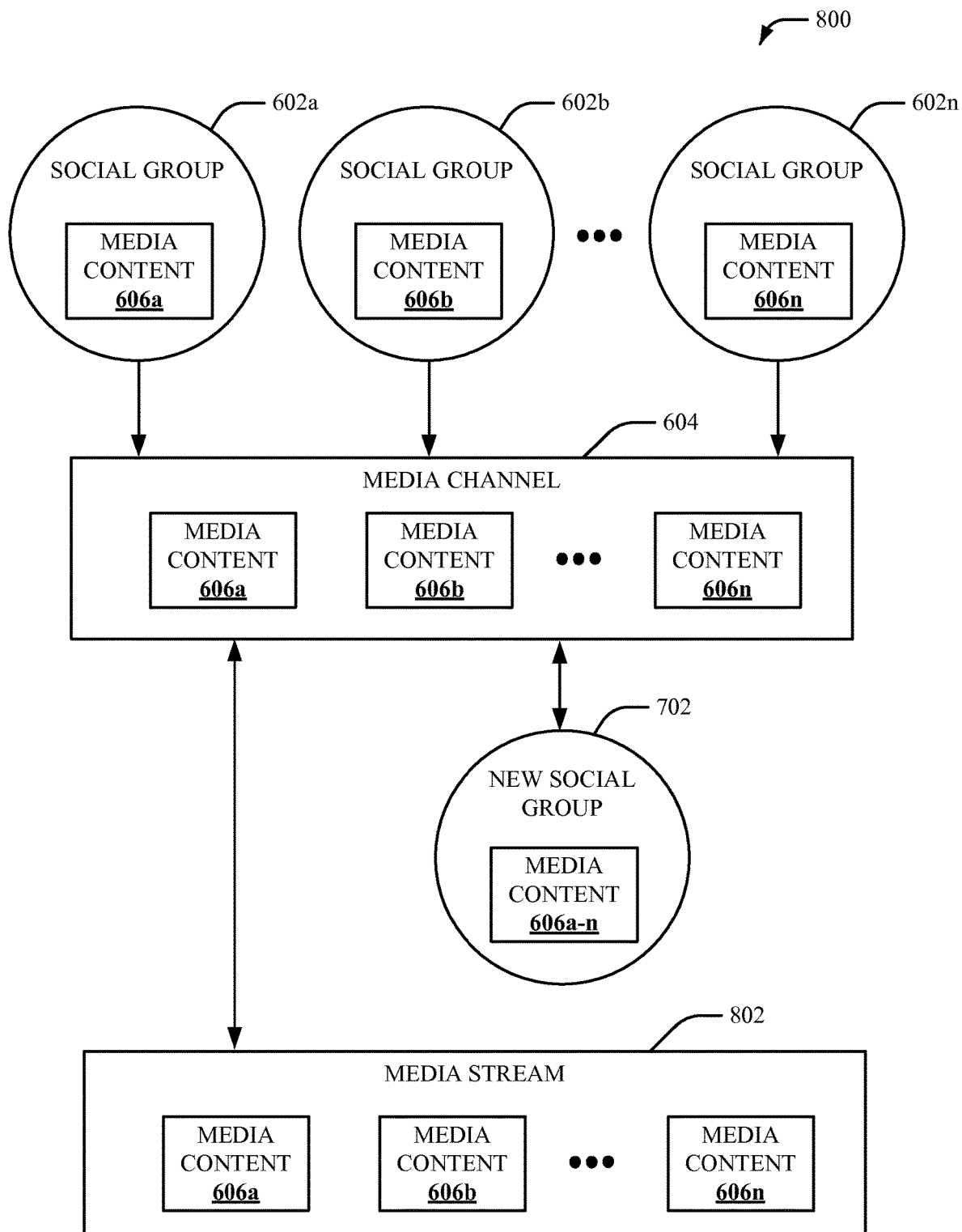
FIG. 8 illustrates an example system for generating a media stream associated with a media channel and/or a new social group associated with the media channel, in accordance with various aspects and implementations described herein.

Referring to FIG. 8, there is illustrated a system 800 in accordance with various aspects and implementations of this disclosure. System 800 includes the social groups 602a-n, the media channel 604 and/or the new social group 702. Each of the social groups can include media content. For example, social group 602a can include media content 606a, social group 602b can include media content 606b, social group 602n can include media content 606n, etc. Furthermore, system 800 includes a media stream 802. The media stream 802 can be generated as a function of the media channel 604 (e.g., the media content 606a-n associated with the social groups 602a-n) and/or the new social group 702. As such, at least a portion of the media content 606a-n associated with the social groups 602a-n, the media channel 604 and/or the new social group 702 can be aggregated into the media stream 802.

Figure 9A:
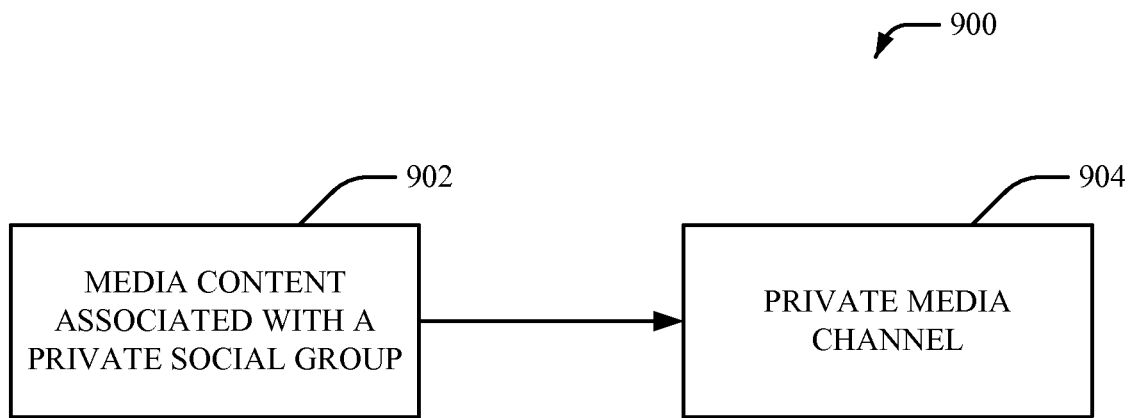
FIGS. 9A and 9B illustrate an example system for generating a media channel based on media content associated with a private social group, in accordance with various aspects and implementations described herein.

Referring to FIG. 9A, there is illustrated a system 900 in accordance with various aspects and implementations of this disclosure. System 900 includes media content 902 and a media channel 904. The media content 902 is associated with a private social group. In one example, the media content 902 includes one or more videos. The media channel 904 is a private media channel. In one example, the media channel 904 is a private video channel (e.g., a video channel of a media sharing service). In another example, the media channel 904 can facilitate a private asynchronous video chat (e.g., a private asynchronous video chat hangout). Furthermore, the media channel 904 is generated based on the media content 902 associated with the private social group. For example, a private social circle or a private social community (e.g., associated with a social networking service) can generate (e.g., curate) the media content 902. Therefore, the private media channel 904 (e.g., associated with a media sharing service) can be generated based on the media content 902 generated by the private social circle or the private social community (e.g., associated with the social networking service). For example, only individuals (e.g., users) associated with the private social circle or the private social community that generated the media content 902 can access and/or augment the media channel 904. As such, a private social circle or a private social community can be employed to create a private media channel that is generated, organized and/or augmented by a select group of individuals (e.g., a select group of users, a select group of members, a select group of account holders, etc.).

Figure 9B:
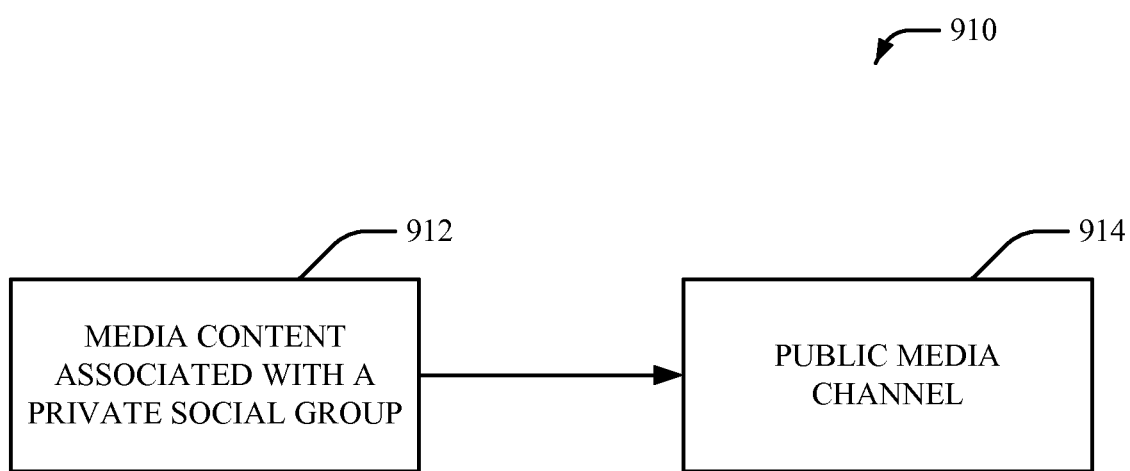

Referring to FIG. 9B, there is illustrated a system 910 in accordance with various aspects and implementations of this disclosure. System 910 includes media content 912 and a media channel 914. The media content 912 is associated with a private social group. In one example, the media content 912 includes one or more videos. The media channel 914 is a public media channel. In one example, the media channel 914 is a public video channel (e.g., a video channel of a media sharing service). In another example, the media channel 914 can facilitate a public asynchronous video chat (e.g., a public asynchronous video chat hangout). Furthermore, the media channel 914 is generated based on the media content 912 associated with the private social group. For example, a private social circle or a private social community (e.g., associated with a social networking service) can generate (e.g., curate) the media content 912. Therefore, the public media channel 914 (e.g., associated with a media sharing service) can be generated based on the media content 912 generated by the private social circle or the private social community (e.g., associated with the social networking service). For example, individuals (e.g., users) associated with the private social group that generated the media content 912 and/or individuals (e.g., users) not associated with the private social group that generated the media content 912 can access and/or augment the media channel 914. As such, a private social circle or a private social community can be employed to create a public media channel that is generated, organized and/or augmented by a select group of individuals (e.g., a select group of users, a select group of members, a select group of account holders, etc.).

Figure 10A:
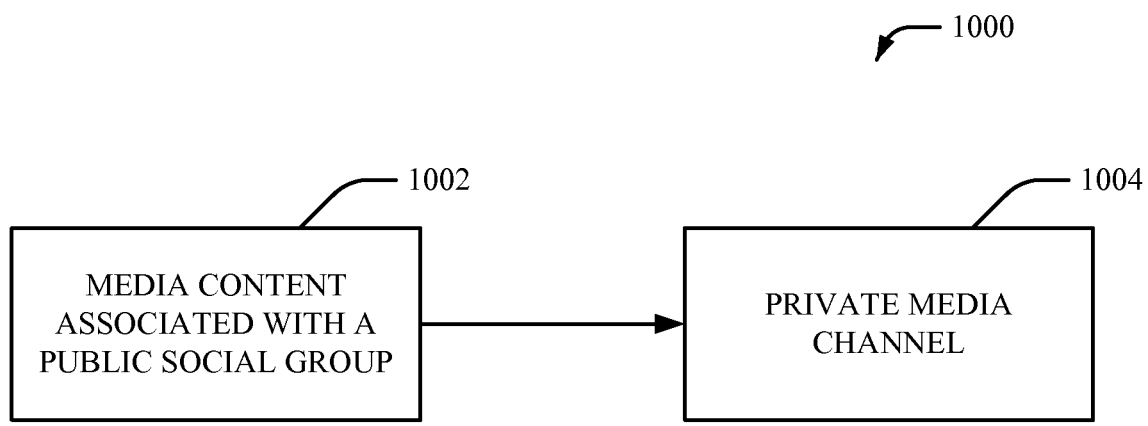
FIGS. 10A and 10B illustrate an example system for generating a media channel based on media content associated with a public social group, in accordance with various aspects and implementations described herein.

Referring to FIG. 10A, there is illustrated a system 1000 in accordance with various aspects and implementations of this disclosure. System 1000 includes media content 1002 and a media channel 1004. The media content 1002 is associated with a public social group (or no social group). In one example, the media content 1002 includes one or more videos. The media channel 1004 is a private media channel. In one example, the media channel 1004 is a private video channel (e.g., a video channel of a media sharing service). In another example, the media channel 1004 can facilitate a private asynchronous video chat (e.g., a private asynchronous video chat hangout). Furthermore, the media channel 1004 is generated based on the media content 1002 associated with the public social group. For example, a public social circle or a public social community (e.g., associated with a social networking service) can generate (e.g., curate) the media content 1002. Therefore, the private media channel 1004 (e.g., associated with a media sharing service) can be generated based on the media content 1002 generated by the public social circle or the public social community (e.g., associated with the social networking service). In another example, individuals (e.g., users, members, account holders, etc.) not associated with a social circle or a social community can generate (e.g., curate) the media content 1002. For example, any individual (e.g., user, member, account holder, etc.) associated with a social networking service and/or a media sharing service can access and/or augment the media channel 1004. As such, a public social group can be employed to create a private media channel that is generated, organized and/or augmented by the public social group, but only select individuals (e.g., select users, select members, select account holders, etc.) can view media content associated with the media channel 1004.

Figure 10B:
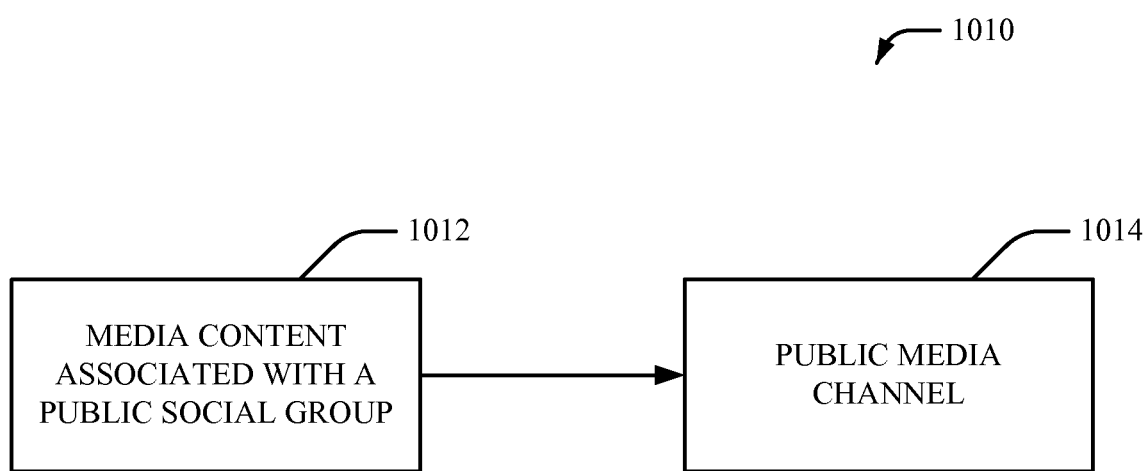

Referring to FIG. 10B, there is illustrated a system 1010 in accordance with various aspects and implementations of this disclosure. System 1010 includes media content 1012 and a media channel 1014. The media content 1012 is associated with a public social group (or no social group). In one example, the media content 1012 includes one or more videos. The media channel 1014 is a public media channel. In one example, the media channel 1014 is a public video channel (e.g., a video channel of a media sharing service). In another example, the media channel 1014 can facilitate a public asynchronous video chat (e.g., a public asynchronous video chat hangout). Furthermore, the media channel 1014 is generated based on the media content 1012 associated with the public social group. For example, a public social circle or a public social community (e.g., associated with a social networking service) can generate (e.g., curate) the media content 1012. Therefore, the public media channel 1014 (e.g., associated with a media sharing service) can be generated based on the media content 1012 generated by the public social circle or the public social community (e.g., associated with the social networking service). In another example, individuals (e.g., users, members, account holders, etc.) not associated with a social circle or a social community can generate (e.g., curate) the media content 1012. For example, any individual (e.g., user, member, account holder, etc.) associated with a social networking service and/or a media sharing service can access and/or augment the media channel 1014. As such, a public social group can be employed to create a private media channel that is generated, organized and/or augmented by the public social group, and any individuals (e.g., users, members, account holders, etc.) can view media content associated with the media channel 1014.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 11-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 11:
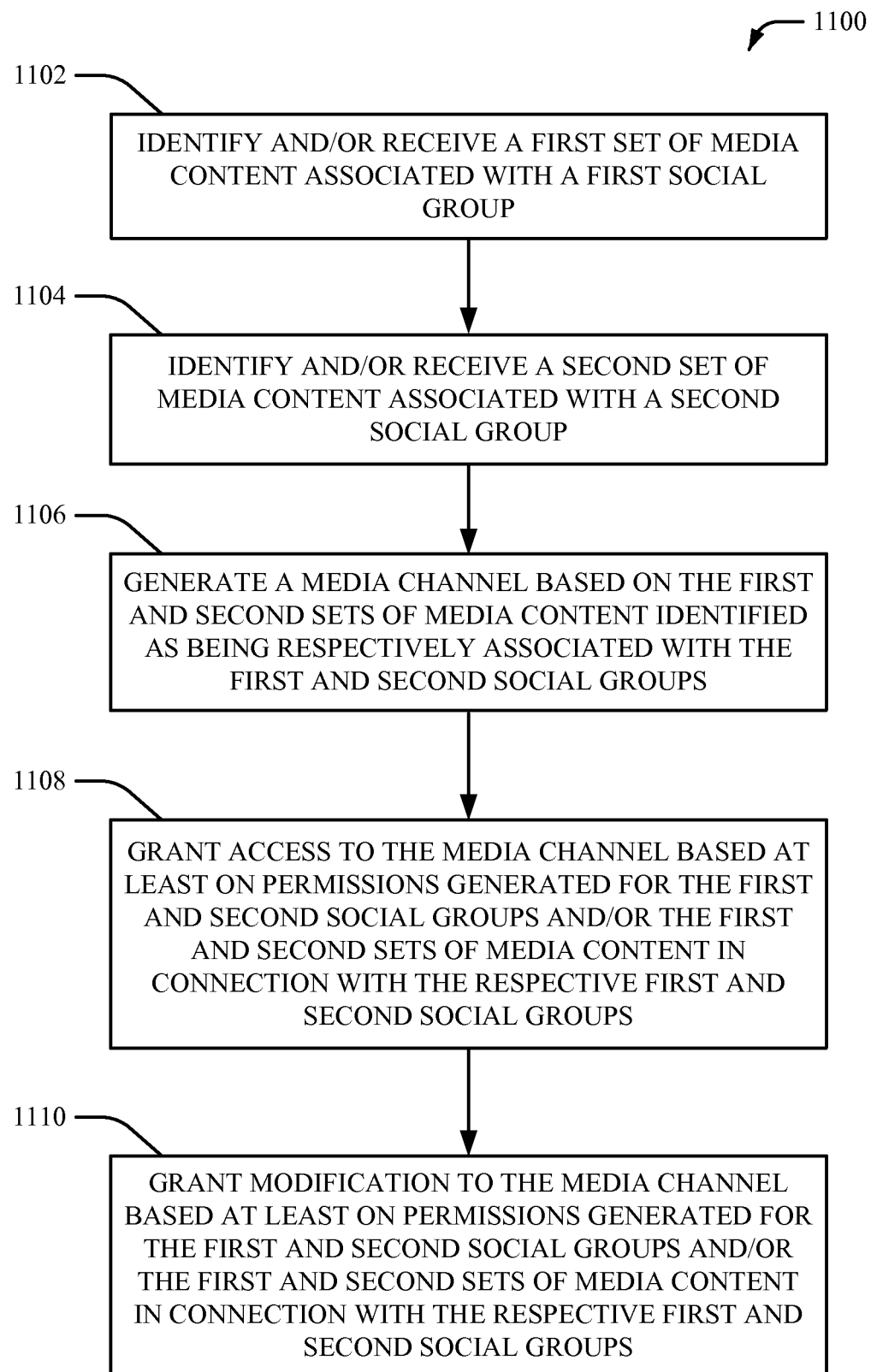
FIG. 11 depicts a flow diagram of an example method for facilitating media channel collaboration, in accordance with various aspects and implementations described herein.

Referring to FIG. 11, there illustrated is a methodology 1100 for facilitating media channel collaboration, according to an aspect of the subject innovation. As an example, methodology 1100 can be utilized in or in connection with various applications, such as, but not limited to, media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, etc. In another example, methodology 1100 can be utilized in or in connection with various devices, such as, but not limited to, a cellular phone (e.g., a smartphone), a television (e.g., an interactive television, an internet-connected television, etc.), a tablet, a personal computer (PC), a desktop computer, a laptop computer, a personal digital assistant (PDA), an electronic reader (e-reader), a camera, a portable computing device, a set-top box, a streaming media device, a gaming device, another media capable device, etc.

At 1102, a first set of media content associated with a first social group is identified and/or received (e.g., by an identification component 104). For example, media content that is generated and/or recommended (e.g., shared, liked, marked, classified, etc.) by one or more individuals (e.g., users, members, account holders, etc.) associated with the first social group can be identified. Media content (e.g., a media file) can include but is not limited to a video (e.g., a video file, a video clip, a video sample, etc.), an image (e.g., an image file, a picture, a thumbnail, etc.), audio (e.g., an audio file, an audio clip, an audio sample, etc.), an electronic book (e-book), a video game and/or other user-generated content.

At 1104, a second set of media content associated with a second social group is identified and/or received (e.g., by an identification component 104). For example, media content that is generated and/or recommended (e.g., shared, liked, marked, classified, etc.) by one or more individuals (e.g., users, members, account holders, etc.) associated with the second social group can be identified.

At 1106, a media channel is generated (e.g., by a generation component 106) based on the first and second sets of media content identified as being respectively associated with the first and second social groups. For example, a media channel that includes at least the first set of media content associated with the first social group and the second set of media content associated with the second social group can be generated.

At 1108, access to the media channel is granted (e.g., by a permissions component 108) based at least on permissions generated for the first and second social groups and/or the first and second sets of media content in connection with the respective first and second social groups. For example, individuals (e.g., users, members, account holders, etc.) that are associated with the first and second social groups can automatically be granted access to the media channel. As such, permissions (e.g., access permissions, etc.) for the media channel can be generated as a function of permissions assigned to the first social group and the second social group (e.g., the first set of media content and the second set of media content).

At 1110, modification to the media channel is granted (e.g., by a permissions component 108) based at least on permissions generated for the first and second social groups and/or the first and second sets of media content in connection with the respective first and second social groups. For example, addition of media content to the media channel can be granted based at least on permissions generated for the first social group and/or the second social group. Additionally or alternatively, removal of media content to the media channel can be granted based at least on permissions generated for the first social group and/or the second social group. Additionally or alternatively, distribution of media content to the media channel can be granted based at least on permissions generated for the first social group and/or the second social group. As such, permissions (e.g., modification permissions, augmentation permissions, distribution permissions, etc.) for the media channel can be generated as a function of permissions assigned to the first social group and/or the second social group (e.g., permissions assigned to individuals associated with the first social group and/or the second social group).

Figure 12:
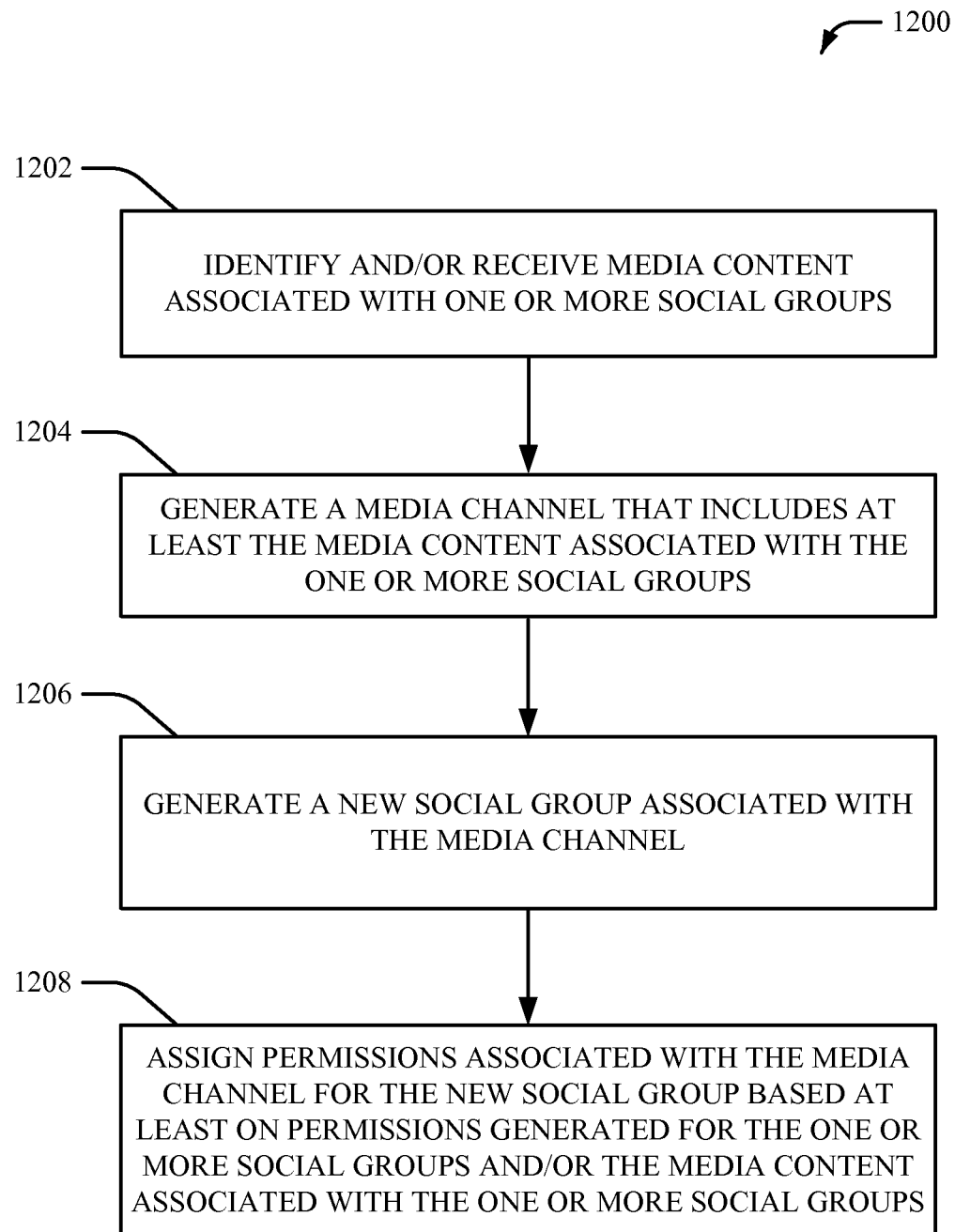
FIG. 12 depicts a flow diagram of an example method for generating a social group for a media channel, in accordance with various aspects and implementations described herein.

Referring to FIG. 12, there illustrated is an example methodology 1200 for generating a social group for a media channel. At 1202, media content associated with one or more social groups is identified and/or received (e.g., by an identification component 104). For example media content associated with one or more social circles and/or one or more social communities can be identified and/or received.

At 1204, a media channel that includes at least the media content associated with the one or more social groups is generated (e.g., by a generation component 106). For example, the media content associated with the one or more social groups can be organized, presented and/or consumed via the media channel.

At 1206, a new social group associated with the media channel is generated (e.g., by a generation component 106). For example, a new social circle associated with the media channel or a new social community associated with the media channel can be generated.

At 1208, permissions associated with the media channel are assigned for the new social circle (e.g., by a permissions component 108) based at least on permissions generated for the one or more social groups and/or the media content associated with the one or more social groups. For example, access permissions for the media channel can be assigned o the new social circle based at least on access permissions generated for the one or more social groups and/or the media content associated with the one or more social groups. In another example, modification permissions (e.g., augmentation permissions) for the media channel can be assigned o the new social circle based at least on modification permissions (e.g., augmentation permissions) generated for the one or more social groups and/or the media content associated with the one or more social groups. In yet another example, distribution permissions for the media channel can be assigned o the new social circle based at least on distribution permissions generated for the one or more social groups and/or the media content associated with the one or more social groups.

Figure 13:
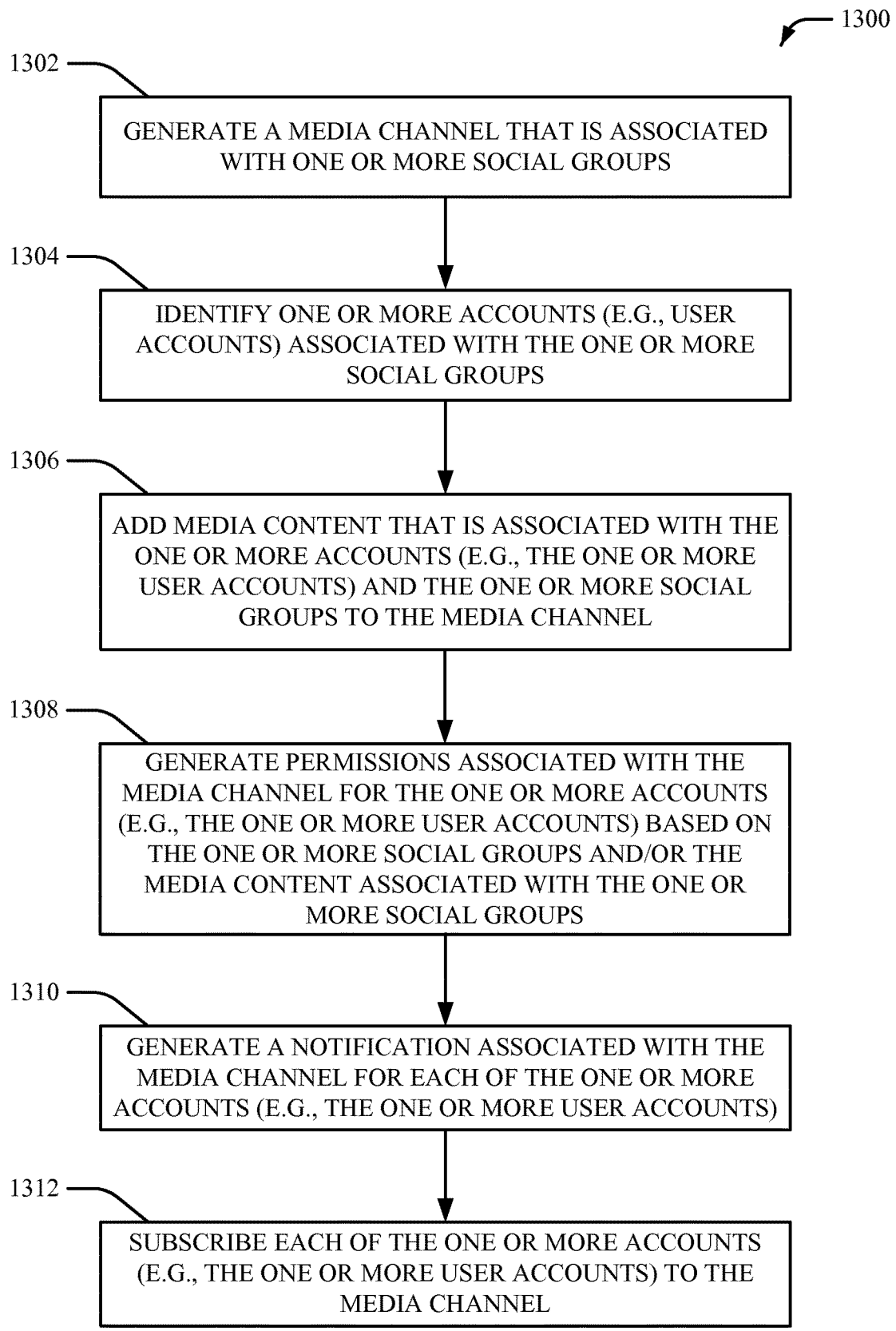
FIG. 13 depicts a flow diagram of an example method for facilitating a collaborative media channel, in accordance with various aspects and implementations described herein.

Referring to FIG. 13, there illustrated is an example methodology 1300 for facilitating a collaborative media channel. At 1302, a media channel that is associated with one or more social groups is generated (e.g., by a generation component 106). For example, a user (e.g., an account holder) can perform an action (e.g., click, drag) to select one or more social groups for media channel collaboration. In response to the selection of the one or more social groups, a media channel associated with the one or more social groups can be generated.

At 1304, one or more accounts (e.g., user accounts) associated with the one or more social groups is identified (e.g., by an identification component 104). For example, one or more accounts (e.g., user accounts) that are included in each of the one or more social groups can be identified.

At 1306, media content that is associated with the one or more accounts (e.g., the one or more user accounts) and the one or more social groups is added to the media channel (e.g., by a generation component 106). For example, generated media content and/or recommended media content associated with each account (e.g., user account) and also included in a social group associated with the media channel can be added to the media channel.

At 1308, permissions associated with the media channel for the one or more accounts (e.g., the one or more user accounts) is generated (e.g., by a permissions component 108) based on the one or more social groups and/or the media content associated with the one or more social groups. For example, access permissions and/or modification permissions for the media channel can be assigned to the one or more accounts (e.g., the one or more user accounts) based on access permissions and/or modification permissions that are assigned to the one or more social groups. Additionally or alternatively, access permissions and/or modification permissions for the media channel can be assigned to the one or more accounts (e.g., the one or more user accounts) based on access permissions and/or modification permissions that are assigned to the media content associated with the one or more social groups.

At 1310, a notification associated with the media channel is generated (e.g., by notification component 302) for each of the one or more accounts (e.g., the one or more user accounts). For example, a link to the media channel can be posted on a social wall and/or a news feed associated with the one or more social groups. In another example, an email notification that includes a link to the media channel can be generated. In yet another example, an SMS notification that includes a link to the media channel can be generated.

At 1312, each of the one or more accounts (e.g., the one or more user accounts) is subscribed to the media channel. For example, each of the one or more accounts (e.g., the one or more user accounts) can be automatically subscribed to the media channel (e.g., each of the one or more accounts can automatically follow the media channel and/or automatically receive updates from the media channel). In an aspect, an option to subscribe or unsubscribe to the media channel can be included in the notification associated with the media channel, another type of notification, and/or another type of communication technique associated with the one or more accounts (e.g., the one or more user accounts).

Figure 14:
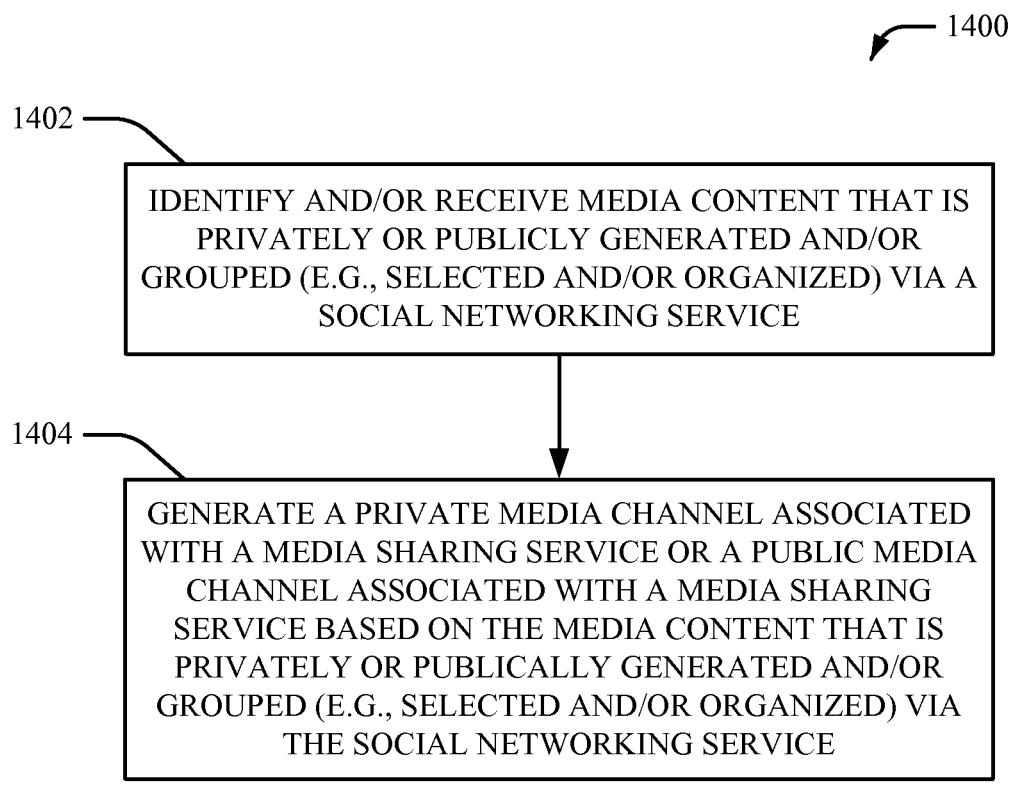
FIG. 14 depicts a flow diagram of an example method for generating, consuming and/or managing a media channel, in accordance with various aspects and implementations described herein.

Referring to FIG. 14, there illustrated is an example methodology 1400 for generating, consuming and/or managing a media channel. At 1402, media content that is privately or publicly generated and/or grouped (e.g., selected and/or organized) via a social networking service is identified and/or received (e.g., by an identification component 104). For example, media content that is generated, selected and/or organized by one or more private social groups (e.g., one or more private social circles, one or more private social communities, etc.) can be identified and/or received. Additionally or alternatively, media content that is generated, selected and/or organized by one or more public social groups (e.g., one or more public social circles, one or more public social communities, etc.) can be identified and/or received.

At 1404, a private media channel associated with a media sharing service or a public media channel associated with a media sharing service is generated (e.g., by a generation component 106) based on the media content that is privately or publically generated and/or grouped (e.g., selected and/or organized) via the social networking service. For example, a private media channel for managing and/or consuming media content can be generated based on the media content that is generated, selected and/or organized by the one or more private social groups (e.g., the one or more private social circles, the one or more private social communities, etc.). Additionally or alternatively, a private media channel for managing and/or consuming media content can be generated based on the media content that is generated, selected and/or organized by the one or more public social groups (e.g., the one or more public social circles, the one or more public social communities, etc.). In another example, a public media channel for managing and/or consuming media content can be generated based on the media content that is generated, selected and/or organized by the one or more private social groups (e.g., the one or more private social circles, the one or more private social communities, etc.). Additionally or alternatively, a public media channel for managing and/or consuming media content can be generated based on the media content that is generated, selected and/or organized by the one or more public social groups (e.g., the one or more public social circles, the one or more public social communities, etc.).

Figure 15:
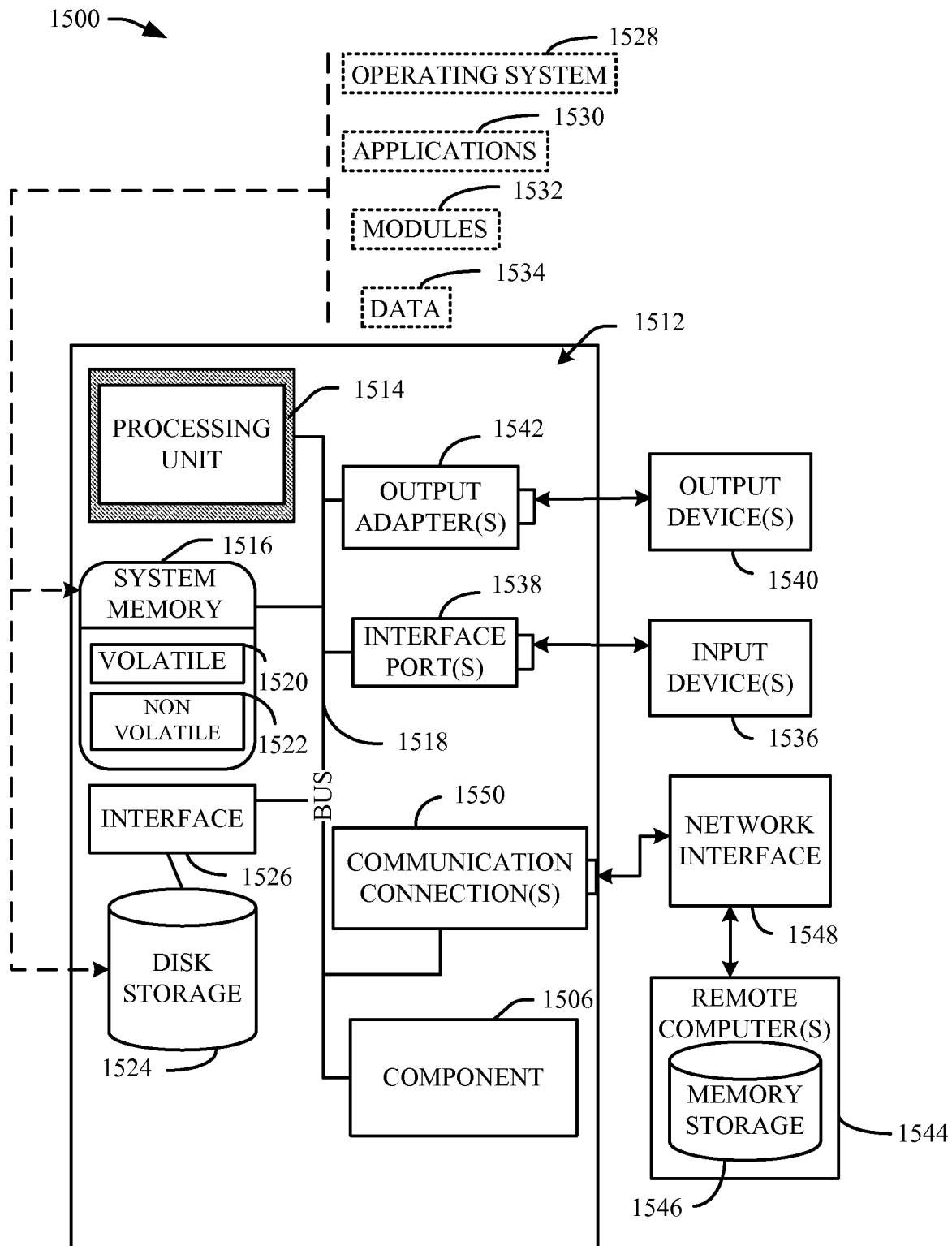
FIG. 15 is a schematic block diagram illustrating a suitable operating environment.
Figure 16:
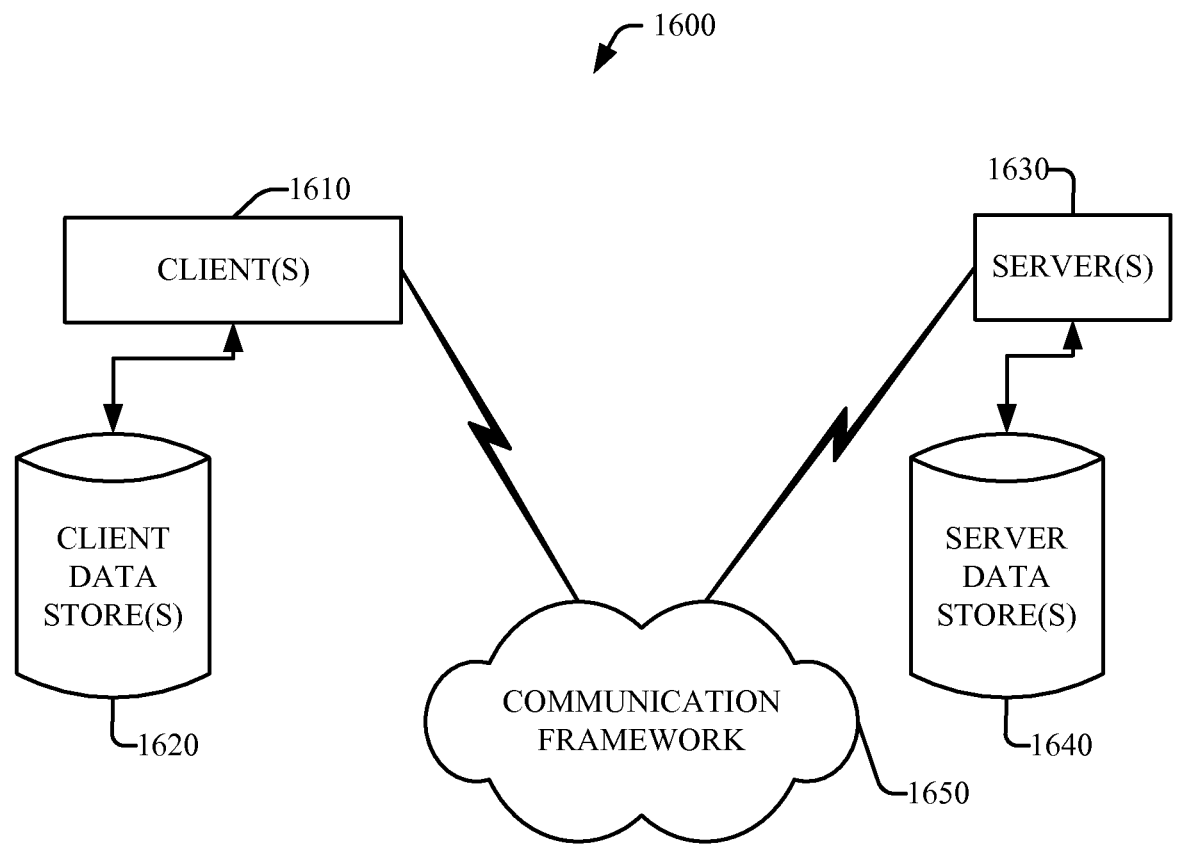
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented.

With reference to FIG. 15, a suitable environment 1500 for implementing various aspects of this disclosure includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1512 also includes removable/non-removable, volatile/non-volatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

FIG. 15 also depicts software that acts as an intermediary between users and the basic computer resources described in the suitable operating environment 1500. Such software includes, for example, an operating system 1528. Operating system 1528, which can be stored on disk storage 1524, acts to control and allocate resources of the computer system 1512. System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

It is to be appreciated that the computer 1512 can be used in connection with implementing one or more of the systems or components shown and described in connection with FIGS. 1-10. In accordance with various aspects and implementations, the computer 1512 can be used to facilitate media content collaboration. In certain exemplary embodiments, the computer 1512 includes a component 1506 (e.g., content component 102) that can contain, for example, an identification component, a generation component, a permissions component, a media channel component, a social group component, a media stream component, a notification component, a geotagging component and/or a subscription component, each of which can respectively function as more fully disclosed herein.

FIG. 16 is a schematic block diagram of a sample-computing environment 1600 with which the subject matter of this disclosure can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing this disclosure, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. The client(s) 1610 are operatively connected to one or more client data store(s) 1620 that can be employed to store information local to the client(s) 1610. Similarly, the server(s) 1630 are operatively connected to one or more server data store(s) 1640 that can be employed to store information local to the servers 1630.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., content component, identification component, generation component, permissions component, media channel component, social group component, media stream component, notification component, geotagging component, subscription component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method for presenting media content, the method comprising:
    generating a media page associated with a social group for presenting media content, wherein the media content includes a plurality of media content items, wherein the social group includes a plurality of users, and wherein the media page provides an environment for the plurality of users in the social group to asynchronously select the plurality of media content items for inclusion in the media page;
    in response to receiving, from a user device associated with a user included in the plurality of users of the social group, a request to add a media content item to the media page, adding the media content item to the media page; and
    causing the media page associated with the social group to be updated to include the added media content item.

2. The method of claim 1, wherein the media page is associated with the social group for presenting a media channel, and wherein the media channel includes the plurality of media content items.

3. The method of claim 1, wherein the media page associated with the social group is a chat interface associated with the social group.

4. The method of claim 1, wherein the media page associated with the social group is a private asynchronous video chat between the plurality of users in the social group.

5. The method of claim 1, wherein each of the plurality of users in the social group is associated with a certain range of a location.

6. The method of claim 5, further comprising determining location information associated with users associated with the social group, wherein the plurality of users in the social group are provided with access to the media page based on the location information.

7. The method of claim 6, wherein the location information includes a wireless communications network.

8. The method of claim 1, wherein access to the media page associated with the social group is based on membership in the social group.

9. The method of claim 1, wherein the media content item added to the media page by the user device was generated by the user device.

10. The method of claim 1, wherein causing the media page to be updated to include the added media content item comprises attribution of the addition of the media content item to the media page to the user associated with the user device.

11. A system for presenting media content, the system comprising:
    a hardware processor that:
        generates a media page associated with a social group for presenting media content, wherein the media content includes a plurality of media content items, wherein the social group includes a plurality of users, and wherein the media page provides an environment for the plurality of users in the social group to asynchronously select the plurality of media content items for inclusion in the media page;
        in response to receiving, from a user device associated with a user included in the plurality of users of the social group, a request to add a media content item to the media page, adds the media content item to the media page; and
        causes the media page associated with the social group to be updated to include the added media content item.

12. The system of claim 11, wherein the media page is associated with the social group for presenting a media channel, and wherein the media channel includes the plurality of media content items.

13. The system of claim 11, wherein the media page associated with the social group is a chat interface associated with the social group.

14. The system of claim 11, wherein the media page associated with the social group is a private asynchronous video chat between the plurality of users in the social group.

15. The system of claim 11, wherein each of the plurality of users in the social group is associated with a certain range of a location.

16. The system of claim 15, wherein the hardware processor further determines location information associated with users associated with the social group, wherein the plurality of users in the social group are provided with access to the media page based on the location information.

17. The system of claim 16, wherein the location information includes a wireless communications network.

18. The system of claim 11, wherein access to the media page associated with the social group is based on membership in the social group.

19. The system of claim 11, wherein the media content item added to the media page by the user device was generated by the user device.

20. The system of claim 11, wherein causing the media page to be updated to include the added media content item comprises attribution of the addition of the media content item to the media page to the user associated with the user device.

21. A non-transitory computer-readable medium containing computer executable instructions that, when executed by a processor, cause the processor to perform a method for presenting media content, the method comprising:

generating a media page associated with a social group for presenting media content, wherein the media content includes a plurality of media content items, wherein the social group includes a plurality of users, and wherein the media page provides an environment for the plurality of users in the social group to asynchronously select the plurality of media content items for inclusion in the media page;

in response to receiving, from a user device associated with a user included in the plurality of users of the social group, a request to add a media content item to the media page, adding the media content item to the media page; and causing the media page associated with the social group to be updated to include the added media content item.

\* \* \* \* \*